(12) United States Patent
Horie et al.

(10) Patent No.: US 8,133,538 B2
(45) Date of Patent: Mar. 13, 2012

(54) METHOD OF PRODUCING MOLD HAVING UNEVEN STRUCTURE

(75) Inventors: Ryoko Horie, Yokohama (JP); Yasuhiro Matsuo, Kawasaki (JP); Nobuhiro Yasui, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 963 days.

(21) Appl. No.: 11/686,512

(22) Filed: Mar. 15, 2007

(65) Prior Publication Data
US 2007/0229942 A1 Oct. 4, 2007

(30) Foreign Application Priority Data

Mar. 17, 2006 (JP) .................................. 2006-075617
Jul. 13, 2006 (JP) .................................. 2006-193248

(51) Int. Cl.
*B05D 5/00* (2006.01)

(52) U.S. Cl. ........ 427/271; 427/273; 427/135; 427/287; 428/601; 164/6; 216/100; 216/102; 216/103; 264/2.5

(58) Field of Classification Search .................. 427/162, 427/163.1, 163.2, 163.3, 163.4, 164–169, 427/135, 283, 271, 273, 270; 216/100, 102, 216/103; 264/2.5; 428/601; 164/6
See application file for complete search history.

(56) References Cited

U.S. PATENT DOCUMENTS

| | | | | |
|---|---|---|---|---|
| 3,715,250 A | * | 2/1973 | Altman et al. ................ 216/108 |
| 3,720,856 A | * | 3/1973 | Brody ............................ 313/309 |
| 4,012,241 A | * | 3/1977 | Lemkey ......................... 148/404 |
| 4,100,044 A | * | 7/1978 | Hussey et al. .................. 205/717 |
| 4,338,132 A | * | 7/1982 | Okamoto et al. ................. 419/5 |
| 4,762,558 A | * | 8/1988 | German et al. ................. 75/246 |
| 6,113,451 A | * | 9/2000 | Hobart et al. .................... 445/50 |
| 6,139,713 A | | 10/2000 | Masuda et al. ................ 205/206 |
| 7,268,948 B2 | | 9/2007 | Matsuo et al. ................. 359/575 |
| 2006/0087758 A1 | | 4/2006 | Imada et al. ..................... 360/48 |

FOREIGN PATENT DOCUMENTS

| | | |
|---|---|---|
| JP | 2-254192 | 10/1990 |
| JP | 10-121292 | 5/1998 |
| JP | 2000-071290 | 3/2000 |
| JP | 2001-074919 | 3/2001 |

* cited by examiner

*Primary Examiner* — Frederick Parker
*Assistant Examiner* — Alex Rolland
(74) *Attorney, Agent, or Firm* — Fitzpatrick, Cella, Harper & Scinto

(57) ABSTRACT

A method of producing a mold having an uneven structure and a mold for an optical element are provided. The method includes forming on a nickel substrate a mixed film using nickel and a material which phase separates from nickel simultaneously, the mixed film including a plurality of cylinders including nickel as a component thereof and a matrix region including the material which phase separates from nickel as a component thereof and surrounding the plurality of cylinders; and removing the matrix portion from the mixed film by etching to give a mold including nickel or a nickel alloy. The uneven structure is disposed in plurality on the substrate, and a pitch of the uneven structure is within a range of 30 nm or more and 500 nm or less and a depth of the uneven structure is within a range of 100 nm or more.

8 Claims, 10 Drawing Sheets

DIRECTION OF UNEVEN STRUCTURE
FORMED ON SUBSTRATE
⟷

METHOD OF PRODUCING MOLD HAVING UNEVEN STRUCTURE

BACKGROUND OF THE INVENTION

1. Field of the Invention

The present invention relates to a method of producing a mold having an uneven structure, a mold for an optical element, and an optical element. In particular, an optical element molded using a mold for an optical element according to the present invention has a function of suppressing the amount of interfacial reflection of light from incident and exit surfaces. For example, the optical element is suitable for imaging apparatuses such as cameras and digital camcorders, and projection apparatuses such as liquid crystal projectors and panels and optical scanning devices of electrophotographic apparatuses.

2. Description of the Related Art

In general, in an optical element for which suppression of the amount of surface reflection is required, a single layer or a plurality of stacked layers of optical film with different refractive indexes having a thickness of several ten nanometers or several hundred nanometers is formed on a surface thereof, whereby desired reflection characteristic are obtained. The optical film is formed by use of a vacuum film-forming process such as vapor deposition or sputtering or a wet film-forming process such as dip coating or spin coating. In any of those film-forming processes, since the film formation needs to be performed after working of an optical element substrate, the production is difficult, thus resulting in a limitation in cost reduction.

On the other hand, it is known that the amount of interfacial reflection can be suppressed by forming on a surface of an optical element a fine shape at a pitch equal to or less than the design wavelength, without use of an optical film. If this principle is utilized to form a fine shape in a mold and an optical element can be produced concurrently with the molding of a substrate, the production cost can be reduced accordingly.

As a technique of forming a fine shape called SWS (Sub-Wave-length Structure), there has been hitherto widely used the semiconductor processing method which advantageously enables a precisely designed SWS to be formed. However, there has been the problem that in the case of forming a fine shape on a curved surface with a large area, this technique has many restrictions and low-cost (or simple) production is extremely difficult.

On the other hand, as a simple technique of producing an SWS, there has been proposed a technique of producing an SWS by utilizing fine particles (see Japanese Patent Application Laid-Open Nos. 2000-071290 and 2001-074919, for example). In Japanese Patent Application Laid-Open No. 2000-071290, in the case of utilizing fine particles, an SWS can be formed entirely over a large area. However, there has been the problem that since fine particles need to be arranged continuously evenly to constitute an SWS, it is difficult to control a volume ratio between a substrate and an atmosphere and an aspect ratio which determine the reflection characteristics and an ideal reflection-preventing effect is difficult to obtain.

On the other hand, as a technique of forming an SWS in a large area and arbitrarily controlling the aspect ratio thereof, an anodization method is known. In an acidic electrolyte solution, a metal such as aluminum is used as an anode and oxidized by causing a current to flow therethrough to thereby form fine pores therein. By utilizing this, there have been developed a technique of arranging pores regularly, a technique of filling pores with a different material and the like (see, for example, Japanese Patent Application Laid-Open Nos. H02-254192 and H1-121292).

SUMMARY OF THE INVENTION

When light is irradiated onto an optical element, reflected light which becomes unnecessary will be generated on incident and exit surfaces of the optical element. Problems due to reflected light generated on the incident and exit surfaces of the optical element at that time will be described by taking a conventional laser beam printer (LBP) as an example. However, the present invention solves the problem, which is a defect due to Fresnel reflection taking place on an interface where light enters and exits and is not limited to the solid surface reflection.

FIG. 10 is a sectional view (main scanning sectional view) in the main scanning direction of a principal part of a conventional optical scanning device used in an LBP and the like. In the figure, the divergent light flux emitted from a light source unit 1 forms substantially parallel light flux or converged light flux with a collimator lens 2. The light flux (amount of light) is subjected to shaping with an aperture diaphragm 3 and enters a cylindrical lens 4 having a refractive power only in the auxiliary scanning direction. The light flux that entered the cylindrical lens 4 exits as such in that state in the main scanning section and is converged in the auxiliary scanning section to form an image approximately as a linear image in the vicinity of a deflection surface 5a of a light deflector 5 composed of a rotating polygonal mirror (polygon mirror).

Further, the light flux reflected and deflected by the deflection surface 5a of the light deflector 5 is guided through an optical imaging unit (fθ lens system) 6 including two fθ lenses 6a and 6b having fθ characteristics onto a photosensitive drum surface 7 as a scanned surface. Further, by rotating the light deflector 5 in a direction indicated by an arrow A, the photosensitive drum surface 7 is optically scanned in a direction indicated by an arrow B (main scanning direction) to perform recording of image information.

In recent years, there are many cases where the fθ lens (optical element) that constitutes the optical imaging unit is a free curved surface shape, so that it becomes popular to produce the lens by using a plastic material which is easy to provide such a shape.

However, since it is difficult, for technical and economical reasons, to provide a surface of a plastic lens with an antireflection film, an antireflection film may be sometimes omitted, so that surface reflection may be occurred on optical surfaces to cause disadvantages. Specifically, surface reflected light generated on an fθ lens surface having no antireflection film is reflected by other optical surfaces to lastly reach an unintended site of a scanned surface to cause a ghost phenomenon.

In particular, as illustrated in FIG. 10, when there are two fθ lenses and an optical surface (fθ lens surface) 6a1 that is nearer to the light deflector 5 has a concave shape, and when an incident light flux has an incident angle which is close to a right angle, the light reflected by the optical surface 6a1 returns to the light deflector 5. The light is then reflected again by the deflection surface (reflection surface) 5a of the light deflector 5 to pass the optical imaging unit 6, and thereafter reaches an unintended site on the photosensitive surface 7 to occur a ghost phenomenon, which is disadvantageous.

Therefore, the present invention has been accomplished to solve the above described problems and provides an optical element in which uniform antireflection characteristics can be obtained over the entire optical surface of the optical element having a limited curvature and a method of producing a mold for the optical element.

The above described problems are solved by the present invention as mentioned below. That is, a method of producing a mold according to a first aspect of the present invention is a method of producing a mold having an uneven structure on a substrate, which includes forming on a substrate a mixed film using a first material and a second material which phase separates from the first material simultaneously, at least one of the first and the second materials containing nickel, and the mixed film including a plurality of cylinders containing the first material as a component thereof and a matrix region containing the second material as a component thereof and surrounding the plurality of cylinders; and removing the matrix region from the mixed film. Thus, the mold including the first material is produced.

A method of producing a mold according to a second aspect of the present invention is a method of producing a mold having an uneven structure on a substrate, which includes forming a film on a substrate using a first material and a second material which phase separates from the first material simultaneously. Thereby, a mixed film is obtained which includes a matrix region containing the first material as a component and a plurality of cylinders containing the second material as a component and surrounded by the matrix region, at least one of the first and the second materials containing nickel. Then, the cylinder portion is removed from the mixed film. Thus, the mold including the first material is produced.

In addition, a mold for an optical element according to a third aspect of the present invention is characterized by being produced by the above described methods of producing a mold for an optical element.

Moreover, an optical element according to a fourth aspect of the present invention is characterized by being molded with the mold for an optical element according to the third aspect of the present invention.

A method of producing a metal mold according to a fifth aspect of the present invention is a method of producing a metal mold having an uneven structure on a substrate, which includes forming on a substrate a mixed film of a first member and a second member which phase separates from the first member simultaneously, the mixed film having a two-phase separated structure including a first and a second columnar members; and dissolving one of the columnar members including one of the two phases of the mixed film to give a metal mold including the other of the columnar members including the other of the two phases.

A method of producing a metal mold according to a sixth aspect of the present is characterized in that the uneven structure is disposed in plurality on the substrate and includes one of the two phases of the mixed film having the two-phase separated structure including the first and the second columnar members, the ratio of an average diameter D1 in a long axis direction to an average diameter Ds in a short axis direction of the one of the two phases is 5 or more, a pitch of the uneven structure is within a range of 30 nm or more and 500 nm or less, and the depth of the uneven structure is within a range of 100 nm or more.

Incidentally, the present invention relates to a method of producing a mold and the term "mold" herein employed includes, for example, a metal mold. However, the present invention includes not only a mold made of only a metal material but also a mold made of a material other than metals and a mold made of a metal material and a material other than the metal material.

According to the present invention, a method of producing a mold having an uneven structure on a substrate and a mold for an optical element can be provided. In addition, according to the present invention, a mold for an optical element having an uneven structure including cylindrical or conical, nickel or nickel alloy members, a method of producing an optical element enabling formation of a plurality of pores on an optical element surface simply can be provided.

Further, according to the present invention, a mold for an optical element having an uneven structure including cylindrical or conical, nickel or nickel alloy members, a method of producing an optical element enabling formation of a plurality of protrusions on an optical element surface simply can be provided.

In addition, according to the present invention, by providing a plurality of pores having a reflection preventing function on the surface of an optical element having a limited curvature, an optical element that can provide uniform reflection preventing characteristics over the entire optical surface can be provided.

Moreover, according to the present invention, by mounting the above described optical element on an optical apparatus, an optical apparatus can be provided in which the disadvantage due to light reflected by an optical element surface can be eliminated, and the amount of transmitted light increases to realize high luminance and energy saving.

Further features of the present invention will become apparent from the following description of exemplary embodiments with reference to the attached drawings.

DESCRIPTION OF THE EMBODIMENTS

An exemplary embodiment of the present invention will be described in detail below but the present invention shall not be limited to the following embodiment.

(Method of Producing Mold)

As to a method of producing a mold including an uneven structure of a convex shape on a substrate of the present invention, a production method in the case of using an aluminum-nickel mixed film in particular will be described.

Figure 1:
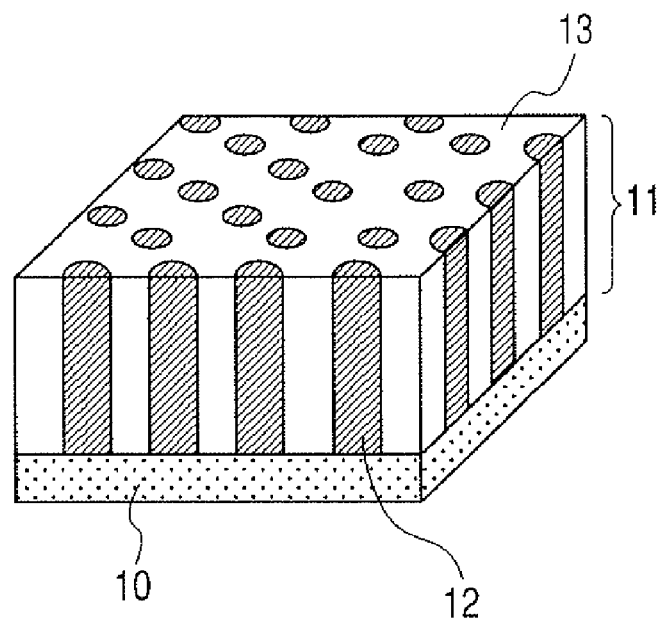
FIG. 1 is a schematic perspective view illustrating a mixed film of nickel and a material which phase separates from nickel for describing a method of producing a mold of the present invention.

Formation of an aluminum-nickel mixed film in a nonequilibrium state is as described below. A plurality of cylinders containing aluminum-nickel ($Al_3Ni$) as a main component and a matrix region containing aluminum (Al) as a component and surrounding the cylinders grow in a phase separated state. As illustrated in FIG. 1, an aluminum-nickel ($Al_3Ni$) 12 portion in a cylindrical state is separated from a matrix region 13 of aluminum (Al) to form a structure body. At this time, the shape of cylindrical aluminum-nickel ($Al_3Ni$) 12 includes a cylindrical shape, a polygonal prism shape, a conic shape, a polygonal pyramid shape and the like.

In addition, in order to obtain the aluminum-nickel ($Al_3Ni$) mixed film 11 having the phase separated structure as shown in FIG. 1, the percentage of nickel in the film is required to be 5 atomic % or more and 60 atomic % or less. The term "atomic %" herein employed is the percentage of atoms contained in the film and can be determined by a quantitative analysis such as ICP (inductively coupled plasma emission spectrometry).

Moreover, the diameter of the cylindrical aluminum-nickel ($Al_3Ni$) and the spacing between the cylinders vary by changing the composition over the entire film thickness subjected to phase separation of the aluminum-nickel ($Al_3Ni$) mixed film. Here, the diameter varies within the range of 5 nm or more and 300 nm or less, and the center-to-center spacing varies within the range of 20 nm or more and 500 nm or less.

The above described aluminum-nickel ($Al_3Ni$) mixed film is subjected to a film formation process, which may be a process enabling film formation in a nonequilibrium state on a substrate and then will not be limited in particular and can be, for example, sputtering and the like. For sputtering, there are several techniques including simultaneous sputtering of an aluminum target and a nickel target, sputtering with a mixed target formed by sintering aluminum/nickel, sputtering with an aluminum target having a nickel chip placed thereon, but the sputtering will not be limited thereto.

Figure 2:
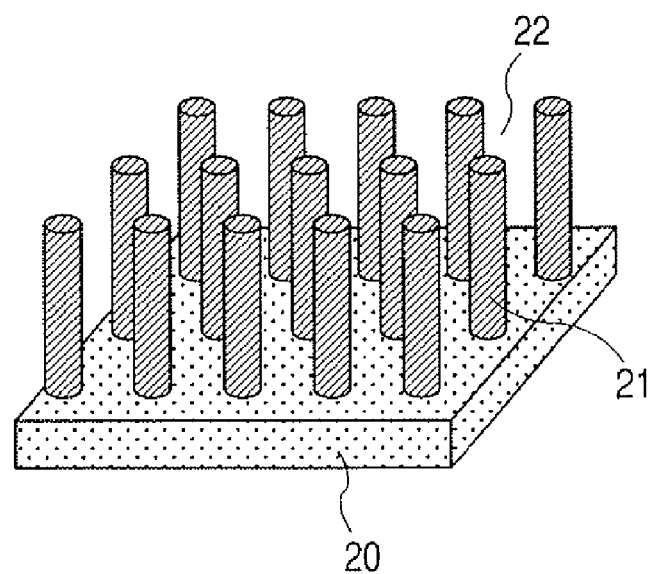
FIG. 2 is a schematic perspective view illustrating an aluminum-nickel mixed film for describing a method of producing a mold of the present invention.

Moreover, the structure body illustrated in FIG. 1 is subjected to etching. Thereby, the aluminum portion of the matrix region 13 is selectively dissolved to enable to form an uneven structure including a convex shape portion (hereinafter, simply referred to as "protrusion") as shown in FIG. 2.

That is, as for a method of producing a mold having a convex uneven structure on a substrate, firstly on a nickel substrate an aluminum-nickel mixed film is formed in a non-equilibrium state. Secondly, a mixed film is obtained which includes a plurality of cylinders containing aluminum-nickel ($Al_3Ni$) as a component and a matrix region surrounding the cylinders and containing aluminum (Al) as a component. Then, the aluminum (Al) in the matrix region is etched and removed selectively with phosphoric acid or ammonia water and the like. Thus, a mold including nickel (Ni) or aluminum-nickel ($Al_3Ni$) can be produced.

In addition, also in a magnesium-nickel mixed film, as is the case with the aluminum-nickel mixed film, a structural body such as shown in FIG. 1 is obtainable. A plurality of cylinders 12 containing cylindrical magnesium-nickel ($Mg_2Ni$) as a component and a matrix region 13 containing magnesium (Mg) as a component and surrounding the cylinders are mutually phase-separated to form a mixed film 11. However, in this case, the percentage of nickel in film is required to be 12 atomic % or more and 70 atomic % or less. At that time, the diameter of the cylindrical magnesium and the spacing between the cylinders vary by changing the composition over the entire film thickness subjected to phase separation of the magnesium-nickel mixed film. Here, the diameter varies within the range of 10 nm or more and 300 nm or less, and the center-to-center spacing varies within the range of 30 nm or more and 500 nm or less. As is the case with the aluminum-nickel mixed film, a nickel substrate is subjected to film formation in a nonequilibrium state to obtain a magnesium-nickel mixed film. Then, magnesium (Mg) in the matrix region is etched and removed selectively, whereby a nickel or nickel alloy mold can be produced. Also for a titanium-nickel mixed film, an yttrium-nickel mixed film, a zirconium-nickel mixed film, as with the aluminum-nickel mixed film and the magnesium-nickel mixed film, molds made of nickel or a nickel alloy can be produced.

As described above, in the method of producing a mold having a convex uneven structure on a substrate of the present invention, the matrix region is subjected to etching removal. Thus, an uneven structure with convex protrusions 21 such as illustrated in FIG. 2 is formed. However, the cylinder portion may be etched and removed to from an uneven structure having pores of a concave shape.

Next, as to the method of producing a mold including a concave uneven structure on a substrate of the present invention, an aluminum-nickel mixed film will be taken as an example to describe the method of production. When forming an aluminum-nickel mixed film in a nonequilibrium state, a plurality of cylinders containing aluminum (Al) as the main component phase separates from a matrix region containing aluminum-nickel ($Al_3Ni$) as a component and surrounding the cylinders.

When grown in such a state, as illustrated in FIG. 1, a structure is formed in which the cylindrical aluminum (Al) 12 portion is split by the aluminum-nickel ($Al_3Ni$) matrix region 13. At that time, the shape of the cylindrical aluminum (Al) 12 includes a cylindrical shape, a polygonal prism shape, a conic shape, a polygonal pyramid and the like.

As with the above described method of producing a mold having a convex uneven structure on a substrate of the present invention, the diameter of the cylindrical aluminum (Al) and the spacing between the cylinders will be as follows. In the aluminum-nickel mixed film, the composition of the entire phase-separation film thickness may be varied to vary the diameter within the range of 5 nm or more and 200 nm or less and the center-to-center spacing within the range of 20 nm or more and 500 nm or less.

Figure 3:
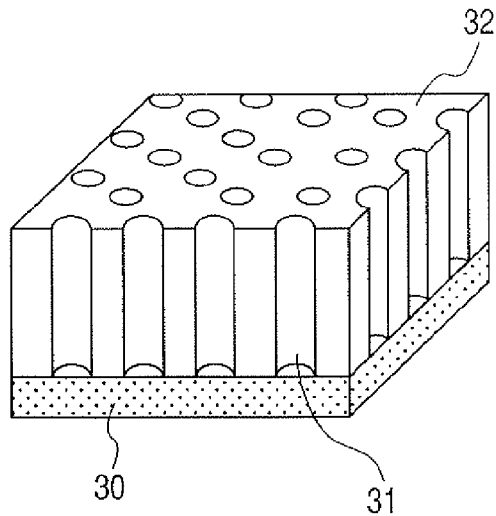
FIG. 3 is a schematic perspective view illustrating an aluminum-nickel mixed film for describing a method of producing a mold of the present invention.

In addition, the film formation process of the above described aluminum-nickel mixed film is not limited in particular as long as it enables a film to be formed on a substrate in a nonequilibrium state and can be sputtering and the like. Moreover, the structure schematically illustrated in FIG. 1 is subjected to etching. Thereby a plurality of cylinder portions 12 containing aluminum as the main component is selectively dissolved to enable an uneven structure having a concave shape portion (hereinafter, simply referred to as "pore") 31 as shown in FIG. 3 to be formed.

That is, as for a method of producing a mold having a convex uneven structure on a substrate, firstly on a nickel substrate, an aluminum-nickel mixed film is formed in a nonequilibrium state. Then, secondly, a mixed film is obtained which includes a plurality of cylinders containing aluminum (Al) as a component and a matrix region surrounding the cylinders and containing aluminum-nickel ($Al_3Ni$) as a component.

From such a structure, aluminum (Al) of the cylinder portion is subjected to etching removal selectively with phosphoric acid or ammonia water, whereby a mold made of nickel (Ni) or aluminum-nickel ($Al_3Ni$) can be produced.

(Production Method 1 of Optical Element Mold)

As to a method of producing a mold for an optical element of the present invention, a production method in the case of using a mixed film composed of nickel and a material having a eutectic equilibrium diagram with nickel will be described. As the material having a eutectic equilibrium diagram with nickel, there are included the following materials.

Materials are included which are selected from the group consisting of aluminum (Al), magnesium (Mg), titanium (Ti), yttrium (Y), zirconium (Zr) and the like. Here, the case where a mixed film of aluminum and nickel is used will be described in detail. In order to produce an optical element that can exhibit a reflection preventing function on the entire surface of the optical surface of the optical element having a limited curvature, the following procedure will be employed.

In a mold for an optical element, the shape of cylinders containing aluminum-nickel ($Al_3Ni$) as a component (in the case of the mold having protrusions) or the shape of cylinders containing aluminum (Al) as a component (in the case of the mold having pores) are controlled.

Figure 4A:
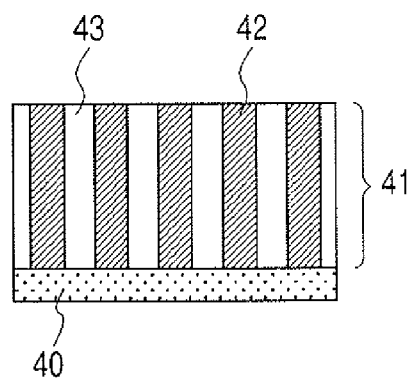
FIGS. 4A and 4B are schematic cross-sectional views illustrating an aluminum-nickel mixed film for describing a method of producing a mold for an optical element of the present invention.
Figure 4B:
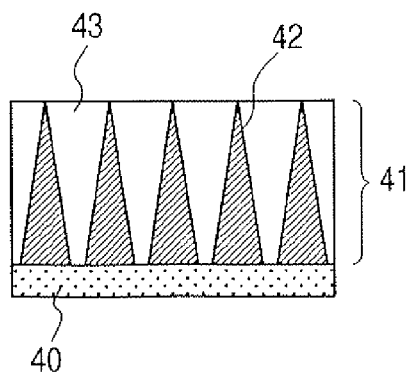

As described above, the composition of an aluminum-nickel mixed film is changed over the entire phase-separation separation film thickness. The percentage of nickel in the film is set to 5 atomic % or more and 60 atomic % or less. Thereby, the cylinder diameter can be changed within the range of 5 nm or more and 300 nm or less and the center-to-center spacing can be changed within the range of 20 nm or more and 500 nm or less. As a method of changing the composition of the entire film thickness to undergo phase separation in the above described aluminum-nickel mixed film, there is a method of causing the film forming rate to vary gradually while an aluminum-nickel mixed film is stacked. Otherwise, there is included a method of stacking an aluminum-nickel mixed film using at least two kinds of targets of different compositional ratios. In the case of sputtering method, film forming conditions such as an input power, a sputtering pressure, a substrate bias, a substrate temperature are controlled to enable the film forming rate to vary. Thus, cylindrical cylinders 42 made of cylindrical aluminum-nickel ($Al_3Ni$) illustrated in FIG. 4A are obtained. Moreover, a structure with the diameter being varied continuously in the film thickness direction such as illustrated in FIG. 4B, that is, conical aluminum-nickel ($Al_3Ni$) cylinders 42 are formed (in the case of a mold having protrusions).

Figure 5A:
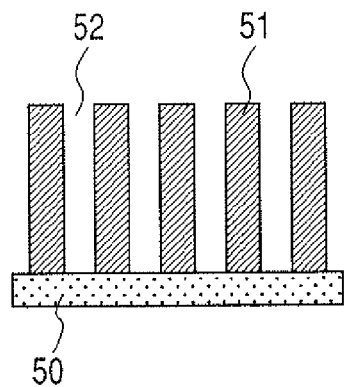
FIGS. 5A and 5B are schematic cross-sectional views illustrating a mold for an optical element of the present invention.
Figure 5B:
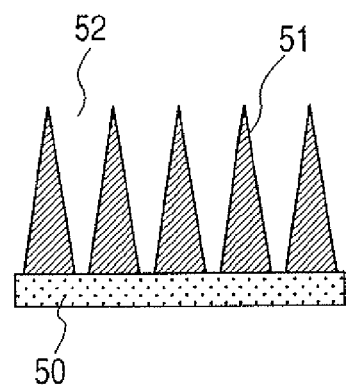

That is, cylindrical or conical aluminum-nickel ($Al_3Ni$) cylinders are formed on a nickel substrate by the above described method. Thereafter, an aluminum (Al) portion surrounding the above described cylinder portion is subjected to etching removal selectively. Thereby, a mold for an optical element having an uneven structure of aluminum-nickel ($Al_3Ni$) having cylindrical or conical protrusions as illustrated in FIGS. 5A and 5B can be produced.

Alternatively, cylindrical or conical aluminum (Al) cylinders are formed on a nickel substrate with the above described method. Then, the above described cylinder portion, that is, the aluminum (Al) portion is subjected to etching removal selectively. Thus, it is possible to produce a mold for an optical element having an uneven structure of aluminum-nickel ($Al_3Ni$) having cylindrical pores as illustrated in FIG. 3 or conical pores (not shown)

Moreover, as the factors for determining the reflection preventing characteristics, the aspect ratio of the above described uneven structure and volume ratio of a base material to atmosphere will be adjusted as follows. The depth of the cylindrical or conical aluminum-nickel ($Al_3Ni$) uneven structure (protrusions) as illustrated in FIGS. 5A and 5B can fall within the range of 100 nm or more and 500 nm or less. The ratio of the sectional area at half the depth of cylindrical or conical aluminum-nickel ($Al_3Ni$) uneven structure (protrusions) to the area of the surface of the nickel substrate can fall within the range of 40% or more and 80% or less (in the case of a mold having protrusions). Otherwise, the depth of cylindrical or conical (not shown) uneven structure (pores) illustrated in FIG. 3 can fall within the range of 100 nm or more and 500 nm or less. Further, the ratio of the sectional area at half the depth of cylindrical or conical uneven structure (pores) to the surface area of nickel substrate can fall within the range of 30% or more and 70% or less (in the case of a mold having pores).

Here, the ratio of the sectional area at half the depth of the above described cylindrical or conical aluminum-nickel ($Al_3Ni$) uneven structure (protrusions) and the above described cylindrical or conical uneven structure (pores) can be controlled. Specifically, the control can be implemented with a method of changing the composition of the entire film thickness subjected to the phase separation in the aluminum-nickel mixed film. Further, the above described film forming rate is considered to control sputtering time.

In addition, the uneven structure according to the present invention shall not be limited to the cylindrical or conical structure illustrated in FIGS. 3, 5A and 5B, but any shape that can be realized by combination of the film forming conditions and compositional ratio is also included.

Figure 6:
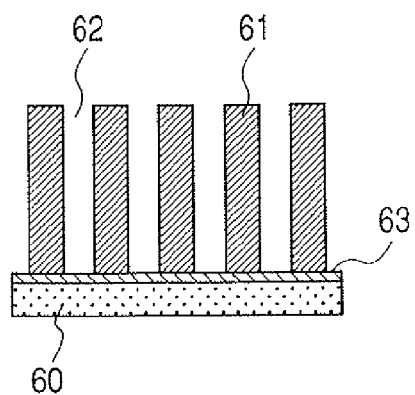
FIG. 6 is a schematic cross-sectional view illustrating a mold for an optical element of the present invention.

Moreover, the mold for an optical element of the present invention may be one such as shown in FIG. 6 in which an adhesive layer 63 is provided between the nickel substrate and the above described aluminum-nickel ($Al_3Ni$) cylinders. The material of the adhesive layer can be titanium (Ti), nickel (Ni) and an alloy thereof.

(Production Method 2 of Optical Element Mold)

As a method of producing a mold for an optical element of the present invention, a production method in the case of using a mixed film made of a material that forms no compound with nickel and nickel will be described. As the material that forms no compound with nickel, there are included silver (Ag), gold (Au) and the like. Here, the case where a mixed film of gold and nickel is taken as an example to describe the method in detail. When performing sputtering of gold and nickel simultaneously in a nonequilibrium state, phase separation into a plurality of cylinder portions containing nickel (Ni) (or gold (Au)) as a main component and a matrix region containing gold (Au) (or nickel (Ni)) surrounding the cylinders as the main component is occurred. At that time, the shape of the cylinder portion containing nickel (Ni)

(or gold (Au)) as the main component is formed by crystal grain boundaries of crystallized nickel and gold, and a polygonal prism shape and a polygonal pyramid shape are contained therein in a larger amount than a cylindrical shape and a conic shape.

As described above, in order to produce an optical element that can exhibit a reflection preventing function on the entire surface of an optical surface of an optical element having a limited curvature, the shape of the cylinders containing nickel (Ni) (or gold (Au)) as a component in the mold for the optical element needs to be controlled. As for the cylindrical shape, the compositional ratio of nickel and gold in the gold-nickel mixed film is caused to vary, whereby the diameter can be varied within the range of 10 nm or more and 100 nm or less and the spacing can be varied within the range of 30 nm or more and 500 nm or less. As a method of varying the compositional ratio of nickel and gold in the gold-nickel mixed film, there is included a method of causing the film forming rate to vary gradually while a gold-nickel mixed film is stacked. Otherwise, a method is included in which at least two kinds of targets of different compositional ratios are used to stack the gold-nickel mixed film. In the case where the sputtering method is employed, film forming conditions such as an input power, a sputtering pressure, a substrate bias, and a substrate temperature can be controlled to vary the film forming rate. With the method as described above, not only a cylindrical nickel (Ni) cylinder as illustrated in FIG. 4A but also a structure having the diameter varied continuously in the film thickness direction is obtained. Thus, the conical nickel (Ni) cylinder as illustrated in FIG. 4B is formed (in the case of a mold having protrusions). That is, cylindrical or conical nickel (Ni) cylinders are formed on a nickel substrate by the above described method. Further, a gold (Au) portion surrounding the above described cylinder portion is selectively subjected to etching removal with a gold-etching solution. Thus, the mold for an optical element having the cylindrical or conical nickel (Ni) uneven structure illustrated in FIGS. 5A and 5B can be produced.

Otherwise, cylindrical or conical gold (Au) cylinders are formed on a nickel substrate by the above described method. The above described cylinder portion, that is, the gold (Au) portion is subjected to etching removal selectively. Thus, the mold for an optical element having a nickel (Ni) uneven structure with cylindrical pores as illustrated in FIG. 3 or conical pores (not shown) can be produced.

Moreover, as the factors for determining reflection preventing characteristics, the aspect ratio of the above described uneven structure and volume ratio of a base material to atmosphere will be adjusted as follows. The depth of the cylindrical or conical nickel (Ni) uneven structure (protrusions) as illustrated in FIGS. 5A and 5B can fall within the range of 100 nm or more and 500 nm or less. The ratio of the sectional area at half the depth of cylindrical or conical gold-nickel uneven structure (protrusions) to the area of the surface of the nickel substrate can fall within the range of 40% or more and 80% or less (in the case of a mold having protrusions). Otherwise, the depth of cylindrical or conical (not shown) uneven structure (pores) illustrated in FIG. 3 can fall within the range of 100 nm or more and 500 nm or less. Further, the ratio of the sectional area at half the depth of cylindrical or conical uneven structure (pores) to the surface area of nickel substrate can fall within the range of 30% or more and 70% or less (in the case of a mold having pores). Here, the ratio of the sectional area at half the depth of the above described cylindrical or conical nickel (Ni) uneven structure (protrusions) and the above described cylindrical or conical uneven structure (pores) can be controlled as follows.

The ratio can be controlled by the above described method in which the compositional ratio of gold and nickel in the gold-nickel mixed film is varied. In addition, the above described film forming rate is considered to control the sputtering time, whereby a desired depth of the uneven structure can be obtained.

In addition, the uneven structure will not be limited to the cylindrical or conical structure illustrated in FIGS. 3, 5A and 5B but will include any shape realized by the combination of the film forming conditions and the compositional ratio.

Moreover, the mold for an optical element of the present invention can be one shown in FIG. 6 in which an adhesive layer 63 is provided between the above described nickel (Ni) cylinders and the nickel substrate. The adhesive layer can be titanium (Ti), nickel (Ni) and an alloy thereof.

Although the above description has been made by taking a gold-nickel mixed film as an example, the present invention also includes a mixed film of Ni and an oxide. The oxide includes MgO, $SiO_2$ and the like. In the method described in Production Method 2, an oxide can be used instead of silver or gold. The production method is approximately the same as Production Method 2 above. Incidentally, the appropriate substrate temperature at the time of sputtering is about 600° C.

(Production Method 3 of Optical Element Mold)

As to a method of producing a mold for an optical element of the present invention, a production method in the case of using a mixed film made of nickel and an oxide will be described. As oxide material, there are included silicon oxide ($SiO_2$), magnesium oxide (MgO), and zinc oxide (ZnO). Here, the case where a mixed film of silicon oxide ($SiO_2$) and nickel is used will be described in detail. When performing sputtering of silicon oxide ($SiO_2$) and nickel simultaneously in a nonequilibrium state, phase separation into a plurality of cylinder portions containing nickel (Ni) (or silicon oxide ($SiO_2$)) as the main component and a matrix region containing silicon oxide ($SiO_2$) (or nickel (Ni)) as the main component and surrounding the cylinders is occurred. At that time, the shape of cylinders containing nickel (Ni) (or silicon oxide ($SiO_2$)) as the main component is formed by crystal grain boundaries of crystallized nickel and silicon oxide, and a polygonal prism shape and a polygonal pyramid shape are contained therein in a larger amount than a cylindrical shape and a conic shape.

As described above, in order to produce an optical element that can exhibit a reflection preventing function on the entire surface of an optical surface of an optical element having a limited curvature, the shape of the cylinders containing nickel (Ni) (or silicon oxide ($SiO_2$)) as a component in the mold for the optical element needs to be controlled. As for the cylindrical shape, the compositional ratio of nickel and silicon oxide ($SiO_2$) in the silicon oxide-nickel mixed film is caused to vary, whereby the diameter can be varied within the range of 10 nm or more and 100 nm or less and the spacing can be varied within the range of 30 nm or more and 500 nm or less. As a method of varying the compositional ratio of nickel and silicon oxide in the silicon oxide-nickel mixed film, there is included a method of causing the film forming rate to vary gradually while a silicon oxide-nickel mixed film is stacked. Otherwise, a method is included in which at least two kinds of targets of different compositional ratios are used to stack the silicon oxide-nickel mixed film. In the case where the sputtering method is employed, film forming conditions such as an input power, a sputtering pressure, a substrate bias, and a substrate temperature can be controlled to vary the film forming rate. With the method as described above, not only a cylindrical nickel (Ni) cylinder as illustrated in FIG. 4A but also a structure having the diameter varied continuously in the film thickness direction is obtained. Thus, the conical nickel (Ni) cylinder as illustrated in FIG. 4B is formed (in the case of a mold having protrusions).

That is, cylindrical or conical nickel (Ni) cylinders are formed on a nickel substrate by the above described method. Further, a silicon oxide ($SiO_2$) portion surrounding the above described cylinder portion is selectively subjected to etching removal with an alkaline etching solution. Thus, the mold for an optical element having the cylindrical or conical nickel (Ni) fine structure illustrated in FIGS. 5A and 5B can be produced.

Otherwise, cylindrical or conical silicon oxide ($SiO_2$) cylinders are formed on a nickel substrate by the above described method. The above described cylinder portion, that is, the silicon oxide ($SiO_2$) portion is subjected to etching removal selectively. Thus, the mold for an optical element having a nickel (Ni) fine structure with cylindrical pores as illustrated in FIG. 3 or conical pores (not shown) can be produced.

Moreover, as to the aspect ratio of the above described fine structure and volume ratio of a base material to atmosphere as the factors for determining reflection preventing characteristics, the depth of the cylindrical or conical nickel (Ni) uneven structure (protrusions) as illustrated in FIGS. 5A and 5B can fall within the range of 100 nm or more and 500 nm or less. The ratio of the sectional area at half the depth of cylindrical or conical nickel (Ni) uneven structure (protrusions) to the area of the surface of the nickel substrate can fall within the range of 40% or more and 80% or less (in the case of a mold having protrusions). Otherwise, the depth of cylindrical or conical (not shown) fine structure (pores) illustrated in FIG. 3 can fall within the range of 100 nm or more and 500 nm or less. Further, the ratio of the sectional area at half the depth of cylindrical or conical fine structure (pores) to the surface area of the nickel substrate can fall within the range of 30% or more and 70% or less (in the case of a mold having pores).

Here, the rate of the sectional area at half the depth of the above described cylindrical or conical nickel (Ni) fine structure (protrusions) and the above described cylindrical or conical fine structure (pores) can be controlled by the above described method in which the compositional ratio of nickel and silicon oxide in the nickel-silicon oxide mixed film is varied. In addition, the above described film forming rate is considered to control the sputtering time, whereby a desired depth of the fine structure can be obtained.

In addition, the fine structure according to the present invention shall not be limited to the cylindrical or conical structure illustrated in FIGS. 3, 5A and 5B but will include any shape realized by the combination of the film forming conditions and the compositional ratio.

Moreover, the mold for an optical element of the present invention can be one shown in FIG. 6 in which an adhesive layer 63 is provided between the above described nickel (Ni) cylinders and the nickel substrate. The adhesive layer can be titanium (Ti), nickel (Ni) and an alloy thereof.

EXAMPLES

Examples according to the present invention will be described below.

Example 1

Figure 7A:
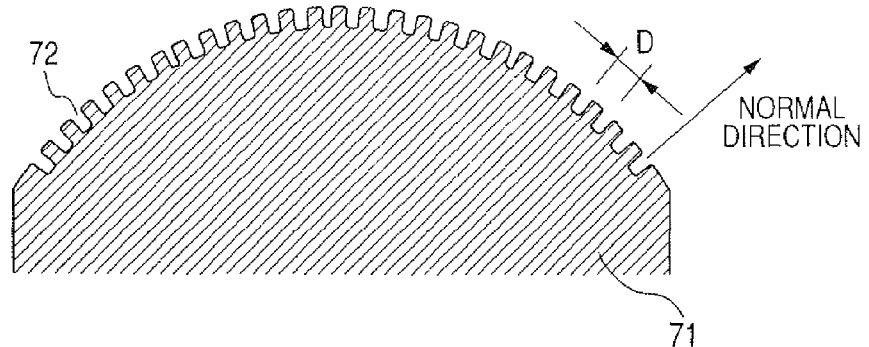
FIGS. 7A and 7B are schematic cross-sectional views illustrating an optical element of an embodiment of the present invention.
Figure 7B:
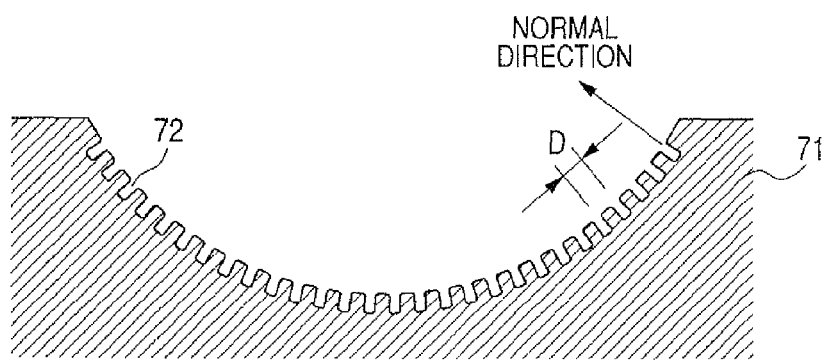

Example 1 relates to using a mold for an optical element having a convex (protruding) aluminum-nickel uneven structure on a nickel substrate to shape an optical element FIGS. 7A and 7B are schematic cross-sectional views illustrating an optical element obtained by a mold of the example of the present invention. FIG. 7A illustrates a case where the base shape of the optical surface is convex. FIG. 7B illustrates a case where the base shape of the optical surface is concave.

In FIGS. 7A and 7B, an optical element (optical member) 71 includes a limited curvature (excluding infinity) and the base shape of the optical surface thereof is formed of a convex surface or a concave surface. The optical surface of the optical element 71 in the present example includes, for example, a refracting surface.

Figure 8A:
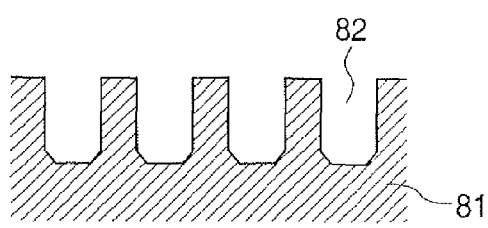
FIGS. 8A and 8B are schematic cross-sectional views illustrating pores or protrusions used in an embodiment of the present invention.

FIG. 8A is a schematic cross-sectional view illustrating a plurality of pores obtained by a mold of the example of the present invention. In the figure, fine pores (concave portion) 82 have a reflection preventing function and are provided randomly on the surface (the base shape being concave or convex) of the optical element 81 having a limited curvature. The pores 82 have substantially the same concave shape and are formed independently in a direction normal to the surface of the optical element 81.

The term "reflection preventing function" herein employed refers to a function of reducing the reflectance of the surface having the pores provided thereon as compared to the reflectance of a mirror surface, preferably to a function to reduce the reflectance to 1% or less. In addition, the term "concave shape" herein employed refers to a partially depressed shape, and includes, for example, a cylindrical shape, a conic shape, a polygonal prism shape, and a polygonal pyramid shape.

Here, the plurality of pores 82 are depicted as independent pores but include connected pores. In addition, the plurality of pores 82 are formed by molding on the surface of the optical element having the limited curvature.

Figure 9A:
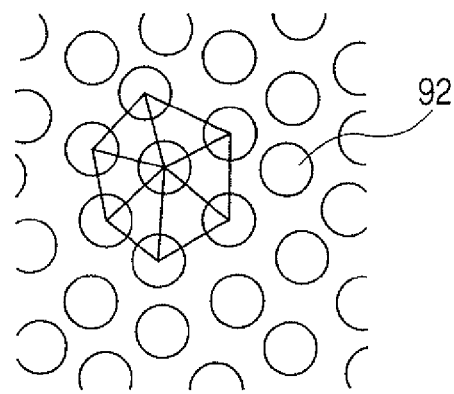
FIGS. 9A and 9B are schematic views illustrating the arrangement of pores and protrusions used in an embodiment of the present invention.
Figure 9B:
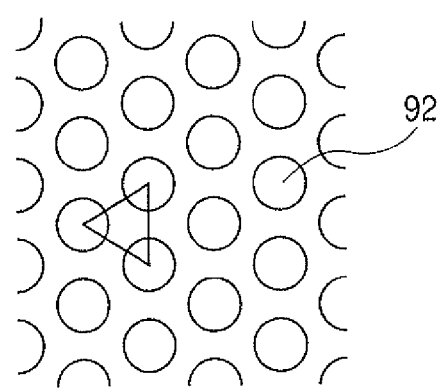

FIGS. 9A and 9B are schematic views illustrating the arrangement of a plurality of pores obtained by the mold of the example of the present invention. FIG. 9A illustrates the case of the present example of having arranged a plurality of pores 92 at random on the surface of the optical element having limited curvature. FIG. 9B illustrates the case where a plurality of pores 92 are disposed in a triangular lattice pattern on the surface of the optical element having limited curvature.

In the present example, when the center-to-center spacing between adjacent ones of the plurality of pores 92 is represented by D, and the wavelength used is represented by $\lambda$, the arrangement of the pores is set so as to satisfy the following condition equation:

$$D < \lambda/2 \qquad (1).$$

Here, the conditional equation (1) defines the upper limit of the center-to-center spacing D of adjacent pores 92. That is, when exceeding the upper limit of the conditional equation (1), it becomes difficult to exhibit excellent reflection preventing characteristics uniformly over the entire optical surface, which is not preferable. In addition, the lower limit does not have any restriction in terms of functions. As long as the below-mentioned volume ratio of pores to an atmosphere is appropriate, it does not matter how small the lower limit is.

Incidentally, the term "center-to-center spacing D of adjacent pores" herein employed refers to the center-to-center spacing in the case where pores are arranged approximately in a triangular lattice state. That is, as shown in FIG. 9A, for each pore inside a measurement region, center-to-center spacings for all of the closest six pores are averaged, respectively, and an average value of the thus obtained average spacings is defined as the center-to-center spacing of the pores in that arrangement.

In the present example, a plurality of pores with substantially the same concave shape as described above are formed independently on the surface of an optical element having a limited curvature in the direction normal to the surface, whereby the entire optical surface is caused to exhibit uniform reflection preventing characteristics.

In the present example, in order to exhibit the reflection preventing function, it is particularly appropriate that the distance between adjacent pores is not more than half the design wavelength λ of the optical element which is said not to generate the 0-order diffracted light.

Therefore, in the present example, by setting such that the center-to-center spacing between adjacent pores satisfies the above described conditional equation (1), the reflection preventing function is exhibited. Here, the term "design wavelength" herein employed refers to the wavelength of light that transmits through or is reflected by an optical element and refers to a wavelength at which the amount of reflected light is intended to be reduced. For example, in the case where visible light is allowed to transmit through an optical element and the amount of reflected light of 600 nm or less is desired to be suppressed, the design wavelength is regarded to be 600 nm and the distance between adjacent pores can be made 300 nm or less. Otherwise, since the laser beam printer exemplified above employs a laser beam of 780 nm or less, the distance between adjacent pores can be 390 nm or less.

In the present example, as described above, a plurality of concave pores are disposed at random on the surface of an optical element having the limited curvature. That is, disposing the pores with certain regularity is advantageous in obtaining reflection preventing characteristics which are sharply responsive to the wavelength but might generate angular dependency of the optical characteristics. For example, in the case of regularly perpendicular arrangement in a grid pattern, the distance between the pores is the shortest when measured along the arrangement direction and is the largest measured in the direction intersecting at an angle of 45° with the arrangement direction. Therefore, the optical characteristics will shift depending on the light incident direction.

Therefore, in the present example, in order to obtain stable optical characteristics without depending on the light incident direction, a plurality of concave pores are disposed at random.

In general, when two substances with different refractive indexes are present mixedly at a pitch shorter than wavelength, the refractive index n12 of the mixed region can be expressed by the following equation (2) using refractive indexes (n1 and n2) of the two substances and the respective volumes (ff1 and ff2) occupied per unit volume.

$$n12 = ff1 \times n1 + ff2 \times n2 \quad (2)$$

Here, when only two substances are present in the mixed region, the equation (3):

$$ff1 + ff2 = 1 \quad (3)$$

is established, and in the case where light enters from the substance 1 to the substance 2 or from the substance 2 to the substance 1 perpendicularly, the equivalent refractive index n12 of that mixed region gives the highest reflection preventing effect, when satisfying the equation (4):

$$n12 = \sqrt{n1 \times n2} \quad (4)$$

For example, in the case where the atmosphere fulfills the pores, when the refractive index of the substance (aluminum-nickel in the present example) constituting the walls of the pores is represented by n, the ratio ff at which the pores occupy the unit volume and the highest reflection preventing effect can be exhibited is expressed by the following equation (5):

$$ff = \frac{n - \sqrt{n}}{n - 1}. \quad (5)$$

If the optical surface having pores formed thereon is an outermost surface being in contact with the atmosphere and the material constituting the walls of the pores has the refractive index n being 1.56, in order to obtain the maximum reflection preventing effect with respect to a perpendicular incident light, the ratio at which the pores occupy the unit volume can be in particular about 56% according to the equation (5). In addition, the optimum value of volume ratio is appropriately set depending on not only the refractive index of the material constituting the walls of pores but also the light incidence angle as well as polarization. Empirically, the pores can be provided in a volume ratio of in particular 35% or more and 62% or less in order to obtain the desired reflection preventing characteristics.

Thus, in the present example, the surface of optical element having the limited curvature as described above is provided with a plurality of concave pores having a reflection preventing function, whereby the entire optical surface is allowed to exhibit uniform reflection preventing characteristics.

Example 2

Example 2 relates to using a mold for an optical element having a concave aluminum-nickel uneven structure on a nickel substrate to shape an optical element.

Figure 8B:
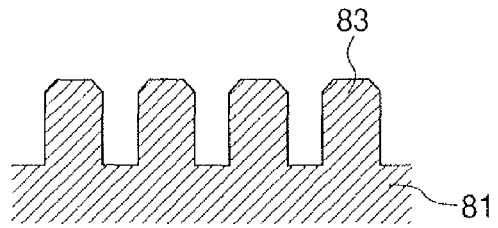

FIG. 8B is a schematic cross-sectional view illustrating a plurality of pores obtained by a mold of the example of the present invention. In the figure, fine protrusions (convex portion) 83 have a reflection preventing function and are provided randomly on the surface (the base shape being concave or convex) of the optical element 81 having a limited curvature. The protrusions 82 have substantially the same convex shape and are formed independently in a direction normal to the surface of the optical element 81.

The term "reflection preventing function" herein employed refers to a function of reducing the reflectance of the surface having the protrusions provided thereon as compared to the reflectance of a mirror surface, preferably to a function to reduce the reflectance to 1% or less. In addition, the term "convex shape" herein employed refers to a partially protruding shape, and includes, for example, a cylindrical shape, a conic shape, a polygonal prism shape, and a polygonal pyramid shape.

Here, the plurality of protrusions 83 are depicted as independent protrusions but include connected protrusions. In addition, the plurality of protrusions 83 are formed by molding on the surface of the optical element having the limited curvature.

FIGS. 9A and 9B are schematic views illustrating the arrangement of a plurality of pores (Example 1) and a plurality of protrusions (Example 2) obtained by the mold of the example of the present invention. In Example 2, FIG. 9A illustrates the case of the present example of having arranged a plurality of protrusions 92 at random on the surface of the optical element having limited curvature. FIG. 9B illustrates the case where a plurality of protrusions 92 are disposed in a triangular lattice pattern on the surface of the optical element having limited curvature.

In the present example, when the center-to-center spacing between adjacent ones of the plurality of protrusions 92 is represented by D, and the wavelength used is represented by λ, the arrangement of the protrusions is set so as to satisfy the following condition equation:

$$D < \lambda/2 \tag{6}$$

Here, the conditional equation (6) defines the upper limit of the center-to-center spacing D of adjacent protrusions 92. That is, when exceeding the upper limit of the conditional equation (6), it becomes difficult to exhibit excellent reflection preventing characteristics uniformly over the entire optical surface, which is not preferable. In addition, the lower limit does not have any restriction in terms of functions. As long as the volume ratio of protrusions to an atmosphere is appropriate, it does not matter how small the lower limit is.

Incidentally, the term "center-to-center spacing D of adjacent protrusions" herein employed refers to the center-to-center spacing in the case where protrusions are arranged approximately in a triangular lattice state. That is, as shown in FIG. 9A, for each protrusion inside a measurement region, center-to-center spacings for all of the closest six protrusions are averaged, respectively, and an average value of the thus obtained average spacings is defined as the center-to-center spacing of the protrusions in that arrangement.

In the present example, a plurality of protrusions with substantially the same convex shape as described above are formed independently on the surface of an optical element having a limited curvature in the direction normal to the surface, whereby the entire optical surface is caused to exhibit uniform reflection preventing characteristics.

In the present example, in order to exhibit the reflection preventing function, it is particularly appropriate that the distance between adjacent protrusions is not more than half the design wavelength λ of the optical element which is said not to generate the 0-order diffracted light.

Therefore, in the present example, by setting such that the center-to-center spacing between adjacent protrusions satisfies the above described conditional equation (6), the reflection preventing function is exhibited. Here, the term "design wavelength" herein employed refers to the wavelength of light that transmits through or is reflected by an optical element and refers to a wavelength at which the amount of reflected light is intended to be reduced. For example, in the case where visible light is allowed to transmit through an optical element and the amount of reflected light of 600 nm or less is desired to be suppressed, the design wavelength is regarded to be 600 nm and the distance between adjacent protrusions can be made 300 nm or less. Otherwise, since the laser beam printer exemplified above employs a laser beam of 780 nm or less, the distance between adjacent protrusions can be 390 nm or less.

In the present example, as described above, a plurality of convex protrusions are disposed at random on the surface of an optical element having the limited curvature. That is, disposing the protrusions with certain regularity is advantageous in obtaining reflection preventing characteristics which are sharply responsive to the wavelength but might generate angular dependency of the optical characteristics. For example, in the case of regularly perpendicular arrangement in a grid pattern, the distance between the protrusions is the shortest when measured along the arrangement direction and is the largest measured in the direction intersecting at an angle of 45° with the arrangement direction. Therefore, the optical characteristics will shift depending on the light incident direction.

Therefore, in the present example, in order to obtain stable optical characteristics without depending on the light incident direction, a plurality of convex protrusions are disposed at random. At that time, as with Example 1, the reflection preventing characteristics can be described as follows:

In general, when two substances with different refractive indexes are present mixedly at a pitch shorter than wavelength, the refractive index $n12$ of the mixed region can be expressed by the following equation (7) using refractive indexes ($n1$ and $n2$) of the two substances and the respective volumes ($ff1$ and $ff2$) occupied per unit volume.

$$n12 = ff1 \times n1 + ff2 \times n2 \tag{7}$$

Here, when only two substances are present in the mixed region, the equation (8):

$$ff1 + ff2 = 1 \tag{8}$$

is established, and in the case where light enters from the substance 1 to the substance 2 or from the substance 2 to the substance 1 perpendicularly, the equivalent refractive index $n12$ of that mixed region gives the highest reflection preventing effect, when satisfying the equation (9):

$$n12 = \sqrt{n1 \times n2} \tag{9}$$

For example, in the case where the atmosphere surrounds the protrusions, when the refractive index of the substance (aluminum-nickel in the present example) constituting the walls of the protrusions is represented by n, the ratio ff at which the protrusions occupy the unit volume and the highest reflection preventing effect can be exhibited is expressed by the following equation (10):

$$ff = \frac{\sqrt{n} - 1}{n - 1}. \tag{10}$$

For example, in the case where the atmosphere fulfills the protrusions, with the refractive index n of the matter (aluminum-nickel for the present example) configuring the walls of the protrusions, the ratio ff occupying the unit volume of the protrusions providing with the highest reflection preventing effect is expressed with the following equation (10):

$$ff = \frac{\sqrt{n} - 1}{n - 1}. \tag{10}$$

If the optical surface having protrusions formed thereon is an outermost surface being in contact with the atmosphere and the material constituting the walls of the protrusions has the refractive index n being 1.56, in order to obtain the maximum reflection preventing effect with respect to a perpendicular incident light, the ratio at which the protrusions occupy the unit volume can be in particular about 44% according to the equation (10). In addition, the optimum value of volume ratio is appropriately set depending on not only the refractive index of the material constituting the walls of protrusions but also the light incidence angle as well as polarization. Empirically, the protrusions can be provided in a volume ratio of in particular 38% or more and 65% or less in order to obtain the desired reflection preventing characteristics Thus, in the present example, the surface of optical element having the limited curvature as described above is provided with a plurality of convex protrusions having a reflection preventing function, whereby the entire optical surface is allowed to exhibit uniform reflection preventing characteristics.

Next, a method of producing an optical element of the present invention will be described. Here, the production method of the present invention shall not be limited to the production method described below. In the following description, it is intended to prevent reflection of 780 nm P-polarized laser. The reflection preventing characteristics of the optical element obtained by the present invention shall not be limited to a single wavelength laser but is applicable to visible light, ultraviolet light, and infrared light as well.

In the present example, a mold for an optical element having a nickel or nickel alloy uneven structure having cylindrical or conical protrusions and formed by film formation using both nickel and a material which phase separates from nickel is produced. Thereafter, the mold is used to transfer the protrusions to thereby form pores, thus producing an optical element.

Further, a mold for an optical element having a nickel or nickel alloy uneven structure having cylindrical or conical pores and formed by film formation using both nickel and a material which phase separates from nickel is produced. Thereafter, the mold is used to transfer the pores to thereby form protrusions, thus producing an optical element.

As described in Method of Producing Mold for Optical Element above, the pitch and the diameter of cylindrical or conical protrusions (or pores) can be controlled by selecting conditions appropriately.

That is, by adopting a sputtering method and appropriately selecting the film forming shaping conditions, desired protrusions (or pores) can be formed at once over the entire mold surface, thereby forming a SWS in a short period of time at low cost.

In addition, the method for transferring protrusions (or pores) formed on a mold includes any shaping method such as injection molding, replication molding, pressure molding, and cast molding, but it is particularly suitable to use the injection molding or pressure molding which enables an SWS to be efficiently transferred and molded together with a substrate. In these methods, at the time of mold release, the direction of the protrusions (or pores) is not always parallel to the mold releasing direction. However, by performing mold release while pores (or protrusions) formed by transfer of protrusions (or pores) is still deformable to a certain degree, for example, prior to complete solidification of pores, mold release can be easily carried out.

(Optical Element Production Method 1)

An optical element production method 1 according to Example 1 is directed to using a mold for an optical element having a cylindrical aluminum-nickel uneven structure (protrusions) on a nickel substrate to mold an optical element.

The optical element production method 1 will be described. At first, a mold having a free curved surface for molding an fθ lens as an optical element was prepared, and a primer layer and an aluminum-nickel layer were uniformly formed in this order on the free curved surface by sputtering, whereby a metal mold having a free curved surface covered by an aluminum-nickel mixed film was obtained. Here, the aluminum-nickel mixed film was formed by a magnetron sputtering process using an RF power supply. As the target, an aluminum target of 4 inches (101.6 mm) in diameter having a nickel chip with 1.5 cm cubic shape disposed thereon was used. The film forming conditions were an input power of RF 40 W, an argon gas pressure of 0.11 Pa and a substrate temperature of 300° C., and the film formation was performed until a desired film thickness was attained. FIG. 4A is a schematic sectional image of the aluminum-nickel mixed film observed with an FE-SEM (Field Emission Scanning Electron Microscope). In the thus formed aluminum-nickel mixed film 41, the aluminum-nickel ($Al_3Ni$) portion 42 was formed cylindrically perpendicularly to the nickel substrate 40. Further, it was also confirmed that the aluminum matrix region 43 was formed surrounding the aluminum-nickel ($Al_3Ni$) portion 42. Further, the entire mold was covered with a masking tape so as to expose only the free curved surface; the portion except the free curved surface was covered so as to be electrically insulated and waterproofed; and the mold was dipped into an aqueous phosphoric acid solution at room temperature. Thus, aluminum surrounding the aluminum-nickel ($Al_3Ni$) portion was dissolved to obtain a mold for fθ lens having the aluminum-nickel ($Al_3Ni$) protrusions on the surface thereof.

When the thus obtained mold for fθ lens was observed with an FE-SEM (Field Emission Scanning Electron Microscope), it was found that numerous protrusions stood perpendicularly to the mold surface in a random arrangement Image processing was carried out to determine the central coordinate positions of the protrusions and to determine center-to-center spacings D between each central protrusion and adjacent six protrusions respectively to thereby find the center-to-center spacing D between adjacent protrusions to be approximately 300 nm. The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm$^2$, respectively.

When the thus obtained fθ lens was observed with an FE-SEM (Field Emission Scanning Electron Microscope), columnar pores arranged at random entirely on the curved surfaces were observed, and the respective columnar pores were confirmed to be formed in a direction normal to the surfaces. In addition, image processing was performed to determine the center positions of the pores and to determine an average of center-to-center spacings D between each central pore and adjacent six pores respectively to thereby find the center-to-center spacing D between adjacent pores to be approximately 300 nm, whereby the transfer of the protrusions of the molds to the lens was confirmed to be attained.

Moreover, when the diameters and depths of the columnar pores were measured with an atomic force microscope (AFM), it was found that the diameters of the pores were approximately uniform toward the tip; the average depth was about 160 nm; and the volume ratio of the pores was about 44%. Then, the reflectance at the time of perpendicular incidence of 780 nm wavelength P-polarized light was measured by use of a spectrophotometer to be 0.7%

(Optical Element Production Method 2)

An optical element production method 2 according to Example 1 is directed to using a mold for an optical element having a conical aluminum-nickel uneven structure (protrusions) on a nickel substrate to mold an optical element.

The optical element production method 2 will be described. At first, a mold having a free curved surface for molding an fθ lens as an optical element was prepared, and with sputtering, a metal mold having a free curved surface covered by an aluminum-nickel mixed film was obtained. Here, as with Optical Element Production Method 1 above, the aluminum-nickel mixed film was formed by a magnetron sputtering process using an RF power supply. As the target, an aluminum target of 4 inches (101.6 mm) in diameter having a nickel chip with 1.5 cm cubic shape disposed thereon was used. Three kinds of targets (Target A, Target B, and Target C)

with different amounts of nickel chip being mounted on an aluminum target were prepared. The percentage of nickel in the film was set to be A>B>C. At first, Target A was used to perform film formation for 10 minutes under the conditions of an input power of RF 40 W, an argon gas pressure of 0.11 Pa, and a substrate temperature of 300° C. Next, after the power supply to Target A was turned off, Target B was used to successively perform film formation for 10 minutes under the conditions of an input power of RF 40 W, an argon gas pressure of 0.11 Pa, and a substrate temperature of 300° C. After the power supply to Target B was turned off, Target C was used to finally perform film formation for 10 minutes under the conditions of an input power of RF 40 W, an argon gas pressure of 0.11 Pa, and a substrate temperature of 300° C. After completion of the film formation, the surface and the sectional shape of the aluminum-nickel mixed film was observed with an FE-SEM (Field Emission Scanning Electron Microscope). FIG. 4B schematically illustrates a sectional image of the aluminum-nickel mixed film observed with the FE-SEM. In the formed aluminum-nickel mixed film 41, the aluminum-nickel ($Al_3Ni$) portion 42 was formed cylindrically perpendicularly to the nickel substrate 40. Further, it was also confirmed that the aluminum matrix region 43 was formed so as to surround the aluminum-nickel ($Al_3Ni$) portion 42. In addition, by using the targets with different aluminum-nickel compositional ratios as described above, the diameter of the aluminum-nickel ($Al_3Ni$) cylinder portion 42 was varied continuously. As a result, the diameter became gradually smaller with increasing distance from the substrate. That is, a conical aluminum-nickel ($Al_3Ni$) cylinder portion 42 was confirmed to be formed.

Further, the entire mold was covered with a masking tape so as to expose only the free curved surface; the portion except the free curved surface was covered so as to be electrically insulated and waterproofed; and the mold was dipped into an aqueous phosphoric acid solution at room temperature. Thus, aluminum surrounding the aluminum-nickel ($Al_3Ni$) portion was dissolved to obtain a mold for fθ lens having the aluminum-nickel ($Al_3Ni$) protrusions on the surface thereof.

When the thus obtained mold for fθ lens was observed with an FE-SEM (Field Emission Scanning Electron Microscope), it was found that numerous protrusions stood perpendicularly to the mold surface in a random arrangement. Image processing was carried out to determine the central coordinate positions of the protrusions and to determine center-to-center spacings D between each central protrusion and adjacent six protrusions respectively to thereby find the center-to-center spacing D between adjacent protrusions to be approximately 240nm. The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm², respectively.

When the thus obtained fθ lens was observed with an FE-SEM (Field Emission Scanning Electron Microscope), columnar pores arranged at random entirely on the curved surfaces were observed, and the respective columnar pores were confirmed to be formed in a direction normal to the surfaces.

In addition, image processing was performed to determine the center positions of the pores and to determine an average of center-to-center spacings D between each central pore and adjacent six pores respectively to thereby find the center-to-center spacing D between adjacent pores to be approximately 240 nm, whereby the transfer of the protrusions of the molds to the lens was confirmed to be attained.

Moreover, when the diameters and depths of the columnar pores were measured with an atomic force microscope (AFM), it was found that the diameters of the pores were approximately uniform toward the tip; the average depth was about 180 nm; and the volume ratio of the pores was about 46%. Then, the reflectance at the time of perpendicular incidence of 780 nm wavelength P-polarized light was measured by use of a spectrophotometer to be 0.6%

(Optical Element Production Method 3)

An optical element production method 3 according to Example 2 is directed to using a mold for an optical element having a cylindrical aluminum-nickel uneven structure (pores) on a nickel substrate to mold an optical element.

The optical element production method 3 will be described. At first, a mold having a free curved surface for molding an fθ lens as an optical element was prepared, and a primer layer and an aluminum-nickel layer were uniformly formed in this order on the free curved surface by sputtering, whereby a metal mold having a free curved surface covered by an aluminum-nickel mixed film was obtained. Here, the aluminum-nickel mixed film was formed by a magnetron sputtering process using an RF power supply. As the target, an aluminum target of 4 inches (101.6 mm) in diameter having a nickel chip with 1.5 cm cubic shape disposed thereon was used. The film forming conditions were an input power of RF 40 W, an argon gas pressure of 0.11 Pa and a substrate temperature of 300° C., and the film formation was performed until a desired film thickness was attained. FIG. 4A is a schematic sectional image of the aluminum-nickel mixed film observed with an FE-SEM (Field Emission Scanning Electron Microscope). In the thus formed aluminum-nickel mixed film 41, the aluminum portion 42 was formed cylindrically perpendicularly to the nickel substrate 40. Further, it was confirmed that the aluminum-nickel ($Al_3Ni$) matrix region 43 was formed surrounding the aluminum portion 42. Further, the entire mold was covered with a masking tape so as to expose only the free curved surface; the portion except the free curved surface was covered so as to be electrically insulated and waterproofed; and the mold was dipped into a phosphoric acid solution at room temperature. Thus, aluminum surrounded by the aluminum-nickel ($Al_3Ni$) portion was dissolved to obtain a mold for fθ lens composed of aluminum-nickel ($Al_3Ni$) having pores on the surface thereof When the thus obtained mold for fθ lens was observed with an FE-SEM (Field Emission Scanning Electron Microscope), it was found that numerous pores stood perpendicularly to the mold surface in a random arrangement Image processing was carried out to determine the central coordinate positions of the pores and to determine center-to-center spacings D between each central pore and adjacent six pores respectively to thereby find the center-to-center spacing D between adjacent pores to be approximately 300 nm The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm², respectively.

When the thus obtained fθ lens was observed with an FE-SEM (Field Emission Scanning Electron Microscope), columnar protrusions arranged at random entirely on the curved surfaces were observed, and the respective columnar protrusions were confirmed to be formed in a direction normal to the surfaces.

In addition, image processing was performed to determine the center positions of the protrusions and to determine an average of center-to-center spacings D between each central protrusion and adjacent six protrusions respectively to thereby find the center-to-center spacing D between adjacent protrusions to be approximately 300 nm, whereby the transfer of the pores of the molds to the lens was confirmed to be attained.

Moreover, when the diameters and heights of the columnar protrusions were measured with an atomic force microscope (AFM), it was found that the diameters of the protrusions were approximately uniform toward the tip; the average height was about 160 nm; and the volume ratio of the pores was about 54%. Then, the reflectance at the time of perpendicular incidence of 780 nm wavelength P-polarized light was measured by use of a spectrophotometer to be 1.4%

(Optical Element Production Method 4)

An optical element production method 4 according to Example 2 is directed to using a mold for an optical element having a conical aluminum-nickel uneven structure (pores) on a nickel substrate to mold an optical element.

The optical element production method 4 will be described. At first, as with Optical Element Production Method 3 above, a mold having a free curved surface for molding an fθ lens as an optical element was prepared, and with sputtering, a metal mold having a free curved surface covered by an aluminum-nickel mixed film was obtained. Here, as with Optical Element Production Method 3 above, the aluminum-nickel mixed film was formed by a magnetron sputtering process using an RF power supply. As the target, an aluminum target of 4 inches (101.6 mm) in diameter having a nickel chip with 1.5 cm cubic shape disposed thereon was used. Three kinds of targets (Target A, Target B, and Target C) with different amounts of nickel chip being mounted on an aluminum target were prepared. The percentage of nickel in the film was set to be A>B>C. At first, Target A was used to perform film formation for 10 minutes under the conditions of an input power of RF 40 W, an argon gas pressure of 0.11 Pa, and a substrate temperature of 300° C. Next, after the power supply to Target A was turned off, Target B was used to successively perform film formation for 10 minutes under the conditions of an input power of RF 40 W, an argon gas pressure of 0.11 Pa, and a substrate temperature of 300° C. After the power supply to Target B was turned off, Target C was used to finally perform film formation for 10 minutes under the conditions of an input power of RF 40 W, an argon gas pressure of 0.11 Pa, and a substrate temperature of 300° C. After completion of the film formation, the surface and the sectional shape of the aluminum-nickel mixed film was observed with an FE-SEM (Field Emission Scanning Electron Microscope). FIG. 4B schematically illustrates a sectional image of the aluminum-nickel mixed film observed with the FE-SEM. In the formed aluminum-nickel mixed film 41, the aluminum portion 42 was formed cylindrically perpendicularly to the nickel substrate 40. Further, it was also confirmed that the aluminum-nickel ($Al_3Ni$) matrix region 43 was formed so as to surround the aluminum portion 42. In addition, by using the targets with different aluminum-nickel compositional ratios as described above, the diameter of the aluminum cylinder portion 42 was varied continuously. As a result, the diameter became gradually smaller with increasing distance from the substrate. That is, a conical aluminum (Al) cylinder portion 42 was confirmed to be formed.

Further, the entire mold was covered with a masking tape so as to expose only the free curved surface; the portion except the free curved surface was covered so as to be electrically insulated and waterproofed; and the mold was dipped into an aqueous phosphoric acid solution at room temperature. Thus, aluminum cylinders surrounded by the aluminum-nickel ($Al_3Ni$) portion were dissolved to obtain a mold for fθ lens composed of aluminum-nickel ($Al_3Ni$) having conical pores formed on the surface thereof.

When the thus obtained mold for fθ lens was observed with an FE-SEM (Field Emission Scanning Electron Microscope), it was found that numerous pores stood perpendicularly to the mold surface in a random arrangement Image processing was carried out to determine the central coordinate positions of the pores and to determine center-to-center spacings D between each central pore and adjacent six pores respectively to thereby find the center-to-center spacing D between adjacent pores to be approximately 240 nm.

Then, the nickel substrate was removed form the mold. The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm$^2$, respectively.

When the thus obtained fθ lens was observed with an FE-SEM (Field Emission Scanning Electron Microscope), columnar protrusions arranged at random entirely on the curved surfaces were observed, and the respective columnar protrusions were confirmed to be formed in a direction normal to the surfaces.

In addition, image processing was performed to determine the center positions of the protrusions and to determine an average of center-to-center spacings D between each central protrusion and adjacent six protrusions respectively to thereby find the center-to-center spacing D between adjacent protrusions to be approximately 240 nm, whereby the transfer of the pores of the molds to the lens was confirmed to be attained.

Moreover, when the diameters and depths of the columnar pores were measured with an atomic force microscope (AFM), it was found that the diameters of the pores were approximately uniform toward the tip; the average depth was about 180 nm; and the volume ratio of the pores was about 52%. Then, the reflectance at the time of perpendicular incidence of 780 nm wavelength P-polarized light was measured by use of a spectrophotometer to be 1.2%

Example 3

Example 3 relates to using a mold for an optical element having a convex (protruding) nickel uneven structure on a nickel substrate to mold an optical element.

In the present example, as with Example 1, by providing a plurality of pores with concave shapes having a reflection preventing function on the surface of an optical element having a limited curvature, the entire optical surface is allowed to exhibit uniform reflection preventing characteristics (Optical Element Production Method 5)

An optical element production method 5 according to Example 3 is directed to using a mold for an optical element having a cylindrical nickel uneven structure (protrusions) on a nickel substrate to mold an optical element.

The optical element production method 5 will be described. At first, as with Examples 1 and 2, a mold having a free curved surface for molding an fθ lens as an optical element was prepared, and a metal mold having a free curved surface covered by a nickel-silicon oxide mixed film was obtained. Here, the nickel-silicon oxide mixed film was formed by a magnetron sputtering process using an RF power supply. The target used was two targets of a nickel target and a silicon oxide target each having a 2-inches (50.8 mm) diameter. Under the film forming conditions of an input power of RF 30 W for the nickel target and an input power of RF 70 W for the silicon oxide target, an argon gas pressure of 0.11 Pa, and a substrate temperature of 600° C., simultaneous deposition (film formation) using two targets was performed until a desired film thickness was attained. FIG. 4A is a schematic sectional image of the nickel-silicon oxide mixed film observed with an FE-SEM (Field Emission Scanning Electron Microscope). In the thus formed nickel-silicon oxide mixed film 41, the nickel (Ni) portion 42 was formed cylindrically perpendicularly to the nickel substrate 40. Further, it was also confirmed that the silicon oxide matrix region 43 was formed surrounding the nickel (Ni) portion 42. Further, the entire mold was covered with a masking tape so as to expose only the free curved surface; the portion except the free curved surface was covered so as to be electrically insulated and waterproofed; and the mold was dipped into an aqueous sodium hydroxide solution at room temperature. Thus, the silicon oxide ($SiO_2$) surrounding the nickel (Ni) portion was dissolved to obtain a mold for fθ lens having the nickel (Ni) protrusions on the surface thereof.

When the thus obtained mold for fθ lens was observed with an FE-SEM (Field Emission Scanning Electron Microscope), it was found that numerous protrusions stood perpendicularly to the mold surface in a random arrangement Image processing was carried out to determine the central coordinate positions of the protrusions and to determine center-to-center spacings D between each central protrusion and adjacent six protrusions respectively to thereby find the center-to-center spacing D between adjacent protrusions to be approximately 300 nm.

The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm², respectively.

When the thus obtained fθ lens was observed with an FE-SEM (Field Emission Scanning Electron Microscope), columnar pores arranged at random entirely on the curved surfaces were observed, and the respective columnar pores were confirmed to be formed in a direction normal to the surfaces.

In addition, image processing was performed to determine the center positions of the pores and to determine an average of center-to-center spacings D between each central pore and adjacent six pores respectively to thereby find the center-to-center spacing D between adjacent pores to be approximately 300 nm, whereby the transfer of the protrusions of the molds to the lens was confirmed to be attained.

Moreover, when the diameters and depths of the columnar pores were measured with an atomic force microscope (AFM), it was found that the diameters of the pores were approximately uniform toward the tip; the average depth was about 160 nm; and the volume ratio of the pores was about 46%.

Then, the reflectance at the time of perpendicular incidence of 780 nm wavelength P-polarized light was measured by use of a spectrophotometer to be 0.6%.

(Optical Element Production Method 6)

An optical element production method 6 according to Example 3 is directed to using a mold for an optical element having a conical nickel uneven structure (protrusions) on a nickel substrate to mold an optical element.

The optical element production method 6 will be described. At first, as with Optical Element Production Method 5 above, a mold having a free curved surface for molding an fθ lens as an optical element was prepared, and with sputtering, a metal mold having a free curved surface covered by a nickel-silicon oxide mixed film was obtained. Here, as with Optical Element Production Method 5 above, the nickel-silicon oxide mixed film was formed by a magnetron sputtering process using an RF power supply. The used target was two targets of a nickel target and a silicon oxide target each having a 2-inch (50.8 mm) diameter. For the film forming conditions, a method was adopted in which the input powers to the two targets were changed stepwise. In a first stage, under the film forming conditions of an input power of RF 58 W for the nickel target and an input power of RF 0 W for the silicon oxide target, an argon gas pressure of 0.11 Pa, and a substrate temperature of 600° C., simultaneous deposition (film formation) was performed for 5 minutes. Next, in a second stage, under the film forming conditions of an input power of RF 46 W for the nickel target and an input power of RF 28 W for the silicon oxide target, an argon gas pressure of 0.11 Pa, and a substrate temperature of 600° C. deposition (film formation) was performed for 5 minutes. Subsequently, there were sequentially performed simultaneous film formation operations in a third stage with an input power of RF 35 W for the nickel target and an input power of RF 55 W for the silicon oxide target; a fourth stage with an input power of RF 23 W for the nickel target and an input power of RF 83 W for the silicon oxide target; and a fifth stage with an input power of RF 12 W for the nickel target and an input power of RF 110 W for the silicon oxide target, for 5 minutes each, each under the conditions of an argon gas pressure of 0.11 Pa and a substrate temperature of 600° C. After completion of the film formation by the five-stage change of the input powers as described above, the surface and the sectional shape of the nickel-silicon oxide mixed film was observed with an FE-SEM (Field Emission Scanning Electron Microscope). FIG. 4B schematically illustrates a sectional image of the nickel-silicon oxide mixed film observed with the FE-SEM. In the formed nickel-silicon oxide mixed film 41, the nickel (Ni) portion 42 was formed cylindrically perpendicularly to the nickel substrate 40. Further, it was also confirmed that the silicon oxide matrix region 43 was formed so as to surround the nickel (Ni) portion 42. In addition, by changing the input powers to vary the compositional ratio of nickel-silicon oxide as described above, the diameter of the nickel (Ni) cylinder portion 42 was varied continuously. As a result, the diameter became gradually smaller with increasing distance from the substrate. That is, a conical nickel (Ni) cylinder portion 42 was confirmed to be formed.

Further, the entire mold was covered with a masking tape so as to expose only the free curved surface; the portion except the free curved surface was covered so as to be electrically insulated and waterproofed; and the mold was dipped into an aqueous phosphoric acid solution at room temperature. Thus, silicon oxide ($SiO_2$) surrounding the nickel (Ni)

portion was dissolved to obtain a mold for fθ lens having the nickel (Ni) protrusions on the surface thereof.

When the thus obtained mold for fθ lens was observed with an FE-SEM (Field Emission Scanning Electron Microscope), it was found that numerous protrusions stood perpendicularly to the mold surface in a random arrangement Image processing was carried out to determine the central coordinate positions of the protrusions and to determine center-to-center spacings D between each central protrusion and adjacent six protrusions respectively to thereby find the center-to-center spacing D between adjacent protrusions to be approximately 240 nm.

The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm$^2$, respectively.

When the thus obtained fθ lens was observed with an FE-SEM (Field Emission Scanning Electron Microscope), columnar pores arranged at random entirely on the curved surfaces were observed, and the respective columnar pores were confirmed to be formed in a direction normal to the surfaces.

In addition, image processing was performed to determine the center positions of the pores and to determine an average of center-to-center spacings D between each central pore and adjacent six pores respectively to thereby find the center-to-center spacing D between adjacent pores to be approximately 240 nm, whereby the transfer of the protrusions of the molds to the lens was confirmed to be attained.

Moreover, when the diameters and depths of the columnar pores were measured with an atomic force microscope (AFM), it was found that the diameters of the pores were approximately uniform toward the tip; the average depth was about 180 nm; and the volume ratio of the pores was about 40%. Then, the reflectance at the time of perpendicular incidence of 780 nm wavelength P-polarized light was measured by use of a spectrophotometer to be 0.6%

Comparative Example 1

Next, for the purpose of comparison with Optical Element Production Methods 1 and 2 above, a comparative example will be described.

A mold having free curved surfaces for molding an fθ lens as an optical element was prepared and injection molding was performed by following the same procedure as Optical Element Production Methods 1 and 2 to obtain an fθ lens having free curved mirror surfaces.

When the thus obtained optical element was observed with a scanning electron microscope, only smooth surfaces were observed. Then, the reflectance at the time of perpendicular incidence of 780 nm wavelength P-polarized light was measured by use of a spectrophotometer to be 4.3%

(Optical Apparatuses)

The optical element of the present invention is applicable to imaging apparatuses such as cameras and digital camcorders and projection apparatuses such as liquid crystal projectors and panels and optical scanning devices of electrophotographic apparatuses. For example, in an optical scanning device of an electrophotographic apparatus, when an fθ lens having a plurality of pores formed on both the light incident and light exit surfaces thereof is mounted on an optical imaging unit, good reflecting characteristics are obtained.

(Optical Scanning Device)

Figure 10:
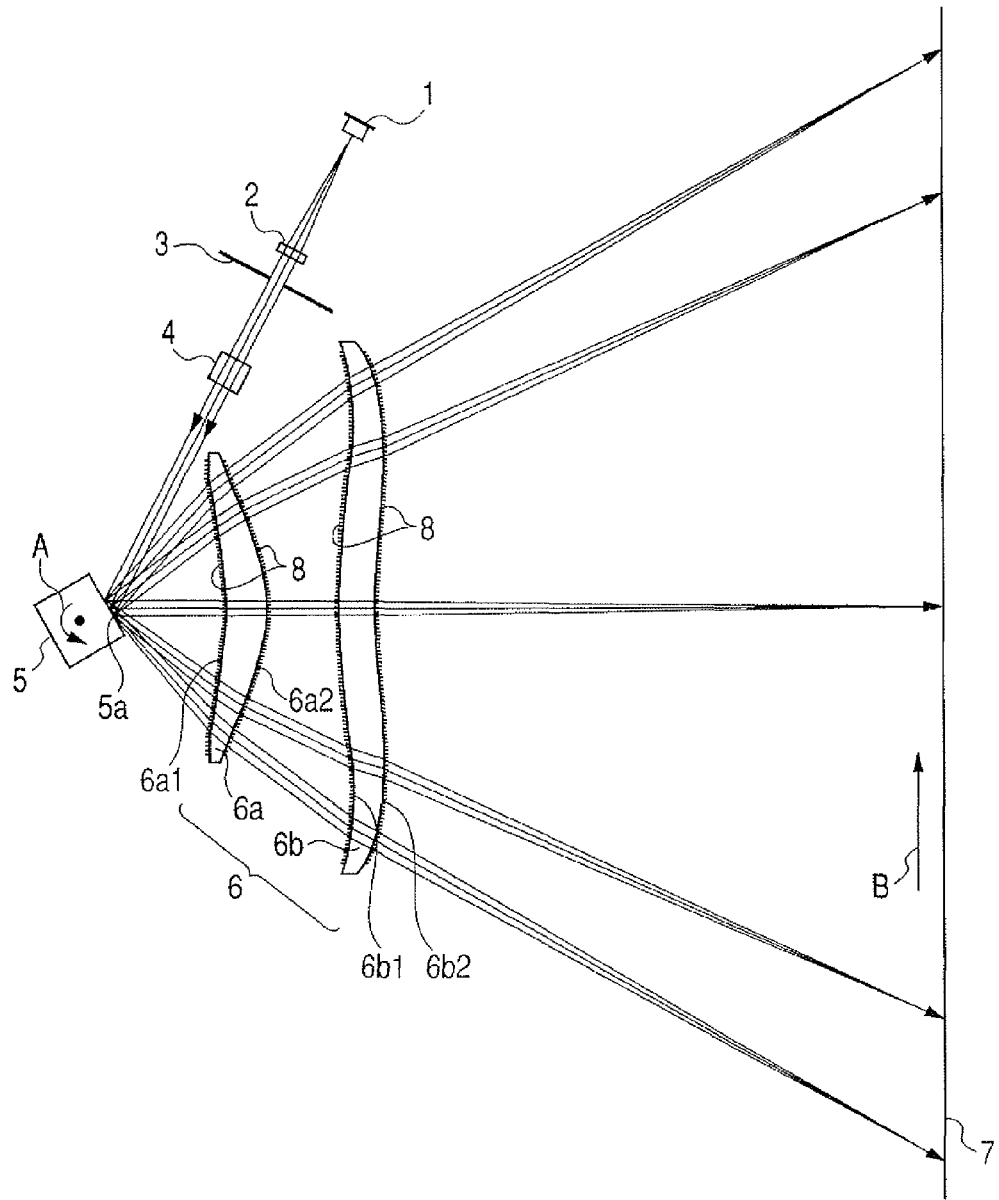
FIG. 10 is a schematic cross-sectional view illustrating a principal part of an optical scanning device having mounted an optical element of the present invention.

FIG. 10 schematically illustrates a principal part of an optical scanning device of an electrophotographic apparatus or the like in which an fθ lens having an optical element produced by Optical Element Production Method 1 above is applied to an optical imaging unit.

In the figure, a light source unit (semiconductor laser) 1 includes, for example, a single laser or multibeam laser. A collimator lens 2 transforms a light flux radiated from the light source unit 1 to a substantially parallel light flux. An aperture diaphragm 3 restricts a passing light flux to shape the beam. A cylindrically lens 4 has a predetermined power only in the auxiliary scanning direction and allows the light flux having passed through the aperture diaphragm 3 to form an approximately linear image in the auxiliary scanning section on a deflection surface (reflection surface) 5a of a light deflector 5 described below.

The light deflector 5 as a deflecting unit includes, for example, a polygon mirror (rotating polygonal mirror) having four surfaces and rotates at a constant speed in the direction of arrow A in the figure with a driving unit (not shown) such as a motor.

An fθ lens system 6 as an optical imaging unit having a light condensing function and fθ characteristics includes two lenses of a first and a second fθ lenses 6a and 6b produced by any of Optical Element Production Methods 1 to 6 above. The first and the second fθ lenses 6a and 6b each have a plurality of pores 12 formed on the light incident surface and the light exit surface 6a1 and 6a2, and 6b1 and 6b2, respectively. A light flux based on image information reflected and deflected by the light deflector 5 is allowed to form an image on a photosensitive drum surface 7 as a scanned surface, and the deflecting surface 5a of the light deflector 5 and the photosensitive drum surface 7 are brought in a conjugate relation in the auxiliary scanning section. Thereby, a tilt correction function is provided.

The photosensitive drum surface 7 is a surface to be scanned. In the present example, a light flux emitted from a semiconductor laser 1 is transformed into a substantially parallel light flux with a collimator lens 2. The light flux is restricted in light amount with an aperture diaphragm 3 and enters a cylindrical lens 4. The substantially parallel light flux that entered the cylindrical lens 4 exits as such in that state in the main scanning section and is converged in the auxiliary scanning section to form an image approximately as a linear image (linear image having a length in the main scanning direction) on a deflection surface 5a of a light deflector 5. Further, the light flux reflected and deflected by the deflection surface 5a of the light deflector 5 passes through a first and a second fθ lenses 6a and 6b to form an image on a photosensitive drum surface 7 in a spot shape. By rotating the light deflector 5 in a direction indicated by an arrow A, the photosensitive drum surface 7 is optically scanned in a direction indicated by an arrow B (main scanning direction). Thereby, image recording is performed on the photosensitive drum surface 7 as a recording medium.

The above described configuration restrains the amount of light reflected by the light incident surface of the fθ lens (optical element) to prevent defects such as ghost and the like and also increases the amount of light transmitted through the light exit surface, so that high luminance and energy saving can be realized. Moreover, the above described configuration enables an inexpensive fθ lens having a reflection preventing function to be used, and in particular, the production cost of an optical apparatus having a plurality of optical elements mounted thereon can be reduced corresponding to the number of the optical elements.

Here, in the above described optical scanning device, a plurality of pores 12 are formed on the light incident surfaces 6a1 and 6b1 and the light exit surfaces 6a2 and 6b2 of the first and the second fθ lenses. However, the present invention is not limited thereto, pores may be formed on only one of fθ lenses or on only one of the light incident and the light exit surfaces.

(Image Forming Apparatus)

Figure 11:
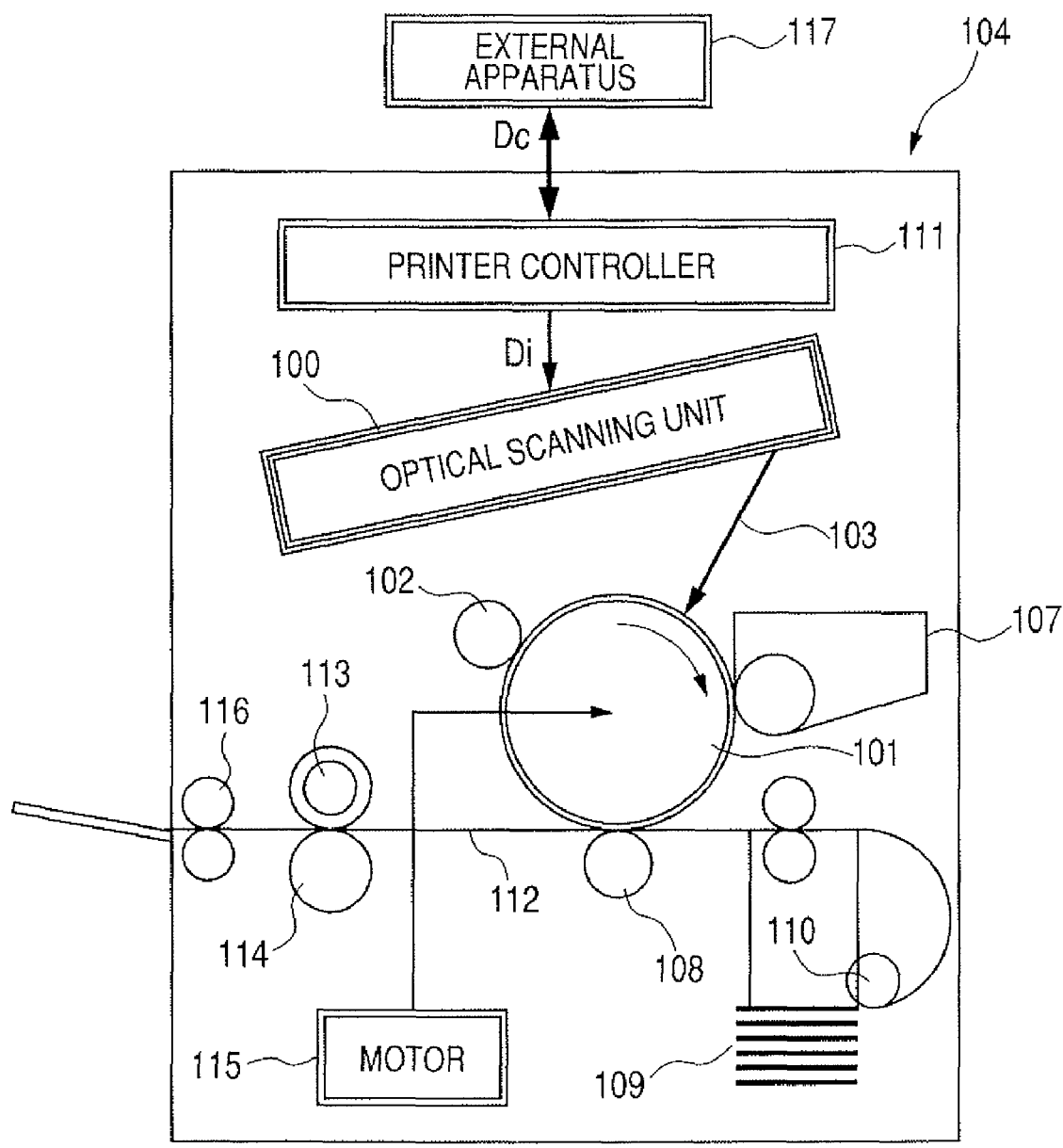
FIG. 11 is a schematic cross-sectional view illustrating a principal part of an image forming apparatus of the present invention.

FIG. 11 is a schematic cross-sectional view taken along the direction of the auxiliary scanning direction of a principal part of an example of an image forming apparatus of the present invention of the present invention using the optical scanning device with the configuration illustrated in FIG. 10. In the image forming apparatus 104 illustrated in FIG. 11, code data Dc is input from an external apparatus 117 such as a personal computer. The code data Dc is transformed into image data (dot data) Di by a printer controller 111 in the apparatus. The code data Di is input to an optical scanning unit 100 having the configuration illustrated in FIG. 10. From the optical scanning unit 100, a light beam 103 modulated according to the image data Di is emitted, and a photosensitive surface of a photosensitive drum 101 is scanned in the main scanning direction with the light beam 103.

The photosensitive drum 101 as an electrostatic latent image carrying member (photosensitive member) is rotated clockwise with a motor 115. According to the rotation, the photosensitive surface of the photosensitive drum 101 moves, with respect to the light beam 103, in the auxiliary scanning direction perpendicular to the main scanning direction. Above the photosensitive drum 101, a charging roller 102 for charging the surface of the photosensitive drum 101 uniformly is provided so as to be in contact with the surface. It is designed such that the surface of the photosensitive drum 202 charged with the charging roller 102 is radiated with the light beam 103 scanned by the above described optical scanning unit 100.

As described above, the light beam 103 is modulated based on the image data Di, and the light beam 103 is irradiated to thereby form an electrostatic latent image on the surface of the photosensitive drum 101. The electrostatic latent image is developed as a toner image with a developing device 107 disposed so as to contact the photosensitive drum 101 more downstream in the rotation direction of the photosensitive drum 101 than the position of the irradiation with the light beam 103.

The toner image developed by the developing device 107 is transferred onto paper 112 as a member for receiving transfer, by the transfer roller disposed so as to face the photosensitive drum 101 below the photosensitive drum 101. The paper 112 is housed inside a paper cassette 109 disposed in front of the photosensitive drum 101 (on the right-hand side in FIG. 11) but may also be fed manually. At the end of the paper cassette 109, a paper feeding roller 110 is disposed so as to feed the paper 112 inside the paper cassette 109 to the conveyance path.

As described above, unfixed toner image is transferred onto the paper 112, which is conveyed to a fixing device disposed behind the photosensitive drum 101 (on the left-hand side in FIG. 11) The fixing device includes a fixing roller 113 having a fixing heater (not shown) internally and a pressing roller 114 arranged so as to contact the fixing roller 113. The paper 112 conveyed from the transferring part is pressed and heated with the fixing roller 113 and the pressing roller 114 to fix the unfixed toner image on the paper 112. Moreover, behind the fixing roller 113, a paper discharge roller 116 is disposed so as to discharge the fixed paper 112 outside the image forming apparatus.

Although not illustrated in FIG. 11, the print controller 111 carries out not only the above described data transformation but also control of respective portions inside the image forming apparatus including the motor 115, a polygon motor inside the optical scanning device described below and the like.

Using the image forming apparatus, a pattern image and a photographic image were output repeatedly, with the result that no ghost phenomenon was generated and no problem was posed for durability.

(Color Image Forming Apparatus)

Figure 12:
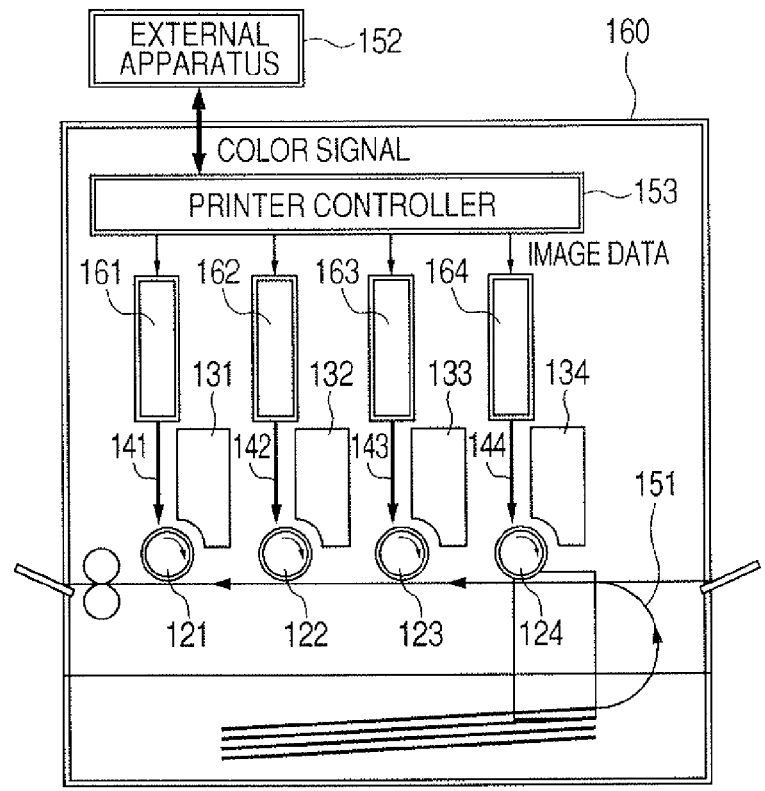
FIG. 12 is a schematic cross-sectional view illustrating a principal part of a color image forming apparatus of the present invention.

FIG. 12 schematically illustrates a principal part of a color image forming apparatus of an example of the present invention having a plurality of optical scanning devices with the configuration illustrated in FIG. 10. The present example is a color image forming apparatus of a tandem type having four optical scanning devices to independently record image information on a photosensitive drum as an image carrying member. FIG. 12 illustrates color image forming apparatus 160 and optical scanning devices 161, 162, 163 and 164 each configured as illustrated in FIG. 10. Photosensitive drums 121, 122, 123 and 124 are image bearing members, and developing devices 131, 132, 133 and 134 and a conveyance belt 151 are provided.

In FIG. 12, into the color image forming apparatus 160, signals of colors of R (red), G (green), and B (black) are input from a external apparatus 152 such as a personal computer. The color signals are transformed into image data (dot data) of C (cyan), M (magenta), Y (yellow), and B (black) by a printer controller 153 disposed inside the apparatus, and the image data is input to the optical scanning devices 161, 162, 163, and 164, respectively. From the optical scanning devices, light beams 141, 142, 143, and 144 modulated according to the respective image data are emitted. With those light beams, the photosensitive surfaces of the photosensitive drums 121, 122, 123, and 124 are scanned in the main scanning direction.

The color image forming apparatus of the present example has the four optical scanning devices 161, 162, 163, and 164 arranged therein. The optical scanning devices correspond to C (cyan), M (magenta), Y (yellow), and B (black) colors, respectively and independently record image signals (image information) on the surfaces of the photosensitive drums 121, 122, 123, and 124, thus printing color images at a high speed.

In the color image forming apparatus of the present example, using the four optical scanning devices 161, 162, 163, and 164 as described above, light beams based on the respective image data are used to form a latent image of each color on the surface of corresponding one of the photosensitive drums 121, 122, 123, and 124. Thereafter, the latent images are multiplex-transferred onto the same recording medium to form one full color image.

As the external apparatus 152, a color image reading apparatus having a CCD sensor, for example, may also be used. In that case, the color image reading apparatus and the color image forming apparatus 160 constitute a digital color copying machine.

Example 4

Example 4 relates to a method of producing a mold having convex lamellar uneven structure on a substrate. Description will be made by taking an example a method of producing a mold using an aluminum-nickel mixed film.

Figure 13:
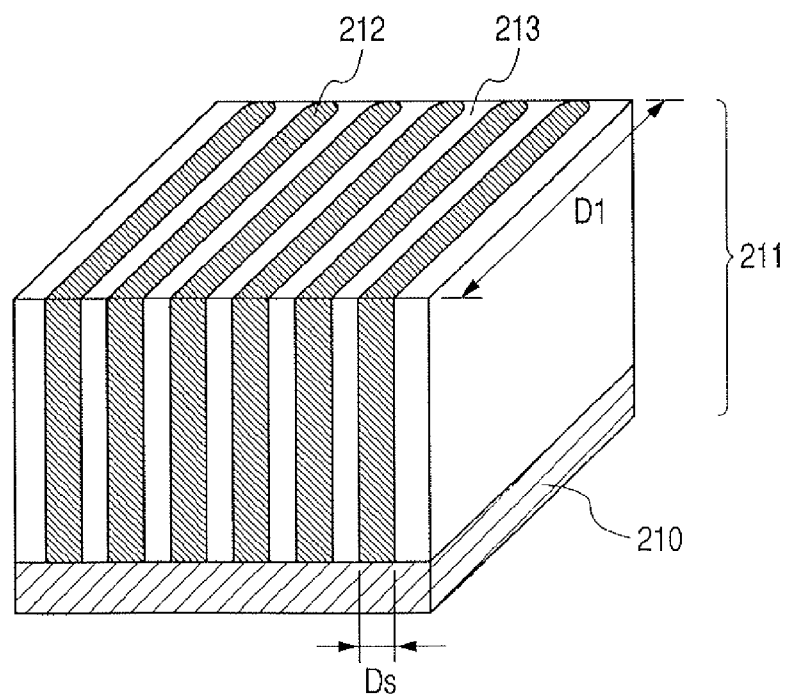
FIG. 13 is a schematic perspective view illustrating an aluminum-nickel mixed film for describing a method of producing a mold of the present invention.

When an aluminum-nickel mixed film is formed in a nonequilibrium state, the film is grown in such a state that two regions of a plurality of columnar members including aluminum-nickel ($Al_3Ni$) as a main component and a plurality of columnar members including aluminum (Al) as a main component are in phase separation, and as illustrated in FIG. 13 a structural body is formed in which an aluminum-nickel ($Al_3Ni$) portion 212 as a columnar member is separated (or split) by a columnar member 213 of aluminum (Al).

At that time, in order to obtain a phase separated aluminum-nickel mixed film such as in FIG. 13, the content of nickel in the film is required to be 20 atomic % or more and 60 atomic % or less. Further, at that time, in order to form a structural body having a ratio (D1/Ds) of an average value D1 of diameters in the long axis direction of the columnar member to an average value Ds of diameters in the short axis direction thereof being 5 or more and an average value of diameters in the short axis direction being 5 nm or more and 300 nm or less, it is necessary to establish a state in which the energy of aluminum and nickel is lost rapidly on the substrate and surface dispersion takes place on such a time scale as to cause phase separation between aluminum and nickel.

Moreover, the diameter of the columnar member and the spacing between the columnar members vary by changing the composition over the entire film thickness subjected to phase separation of the aluminum-nickel mixed film, and the diameter varies within the range of 5 nm or more and 300 nm or less, and the center-to-center spacing varies within the range of 20 nm or more and 500 nm or less.

The film formation process of the aluminum-nickel mixed film is not particularly limited as long as it enables a film to be formed on a substrate in a nonequilibrium state. The film forming method in a nonequilibrium state can be sputtering, electron beam vapor deposition and the like that are performed in a gas phase or in vacuum, with sputtering being appropriate. As the sputtering, there are several techniques including simultaneous sputtering of an aluminum target and a nickel target, sputtering with a mixed target formed by sintering an aluminum target and a nickel target, sputtering with an aluminum target having a nickel chip placed thereon, but the sputtering will not be limited thereto.

Further, when performing sputtering, by selecting a distance between a sputtering target and a substrate, an input power, species of a process gas, a pressure of a process gas, a substrate temperature, a bias applied to the substrate and the like, the formation of the structural body can be highly controlled. Accordingly, by optimizing the above described film forming conditions, a structural body is formed in which an aluminum-nickel ($Al_3Ni$) portion 212 as a columnar member is separated (or split) by a columnar member 213 of aluminum (Al).

Figure 14:
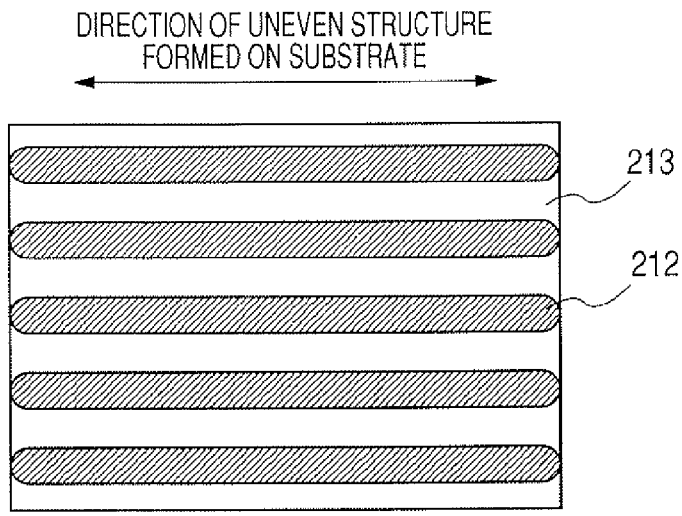
FIG. 14 is a schematic view illustrating an aluminum-nickel mixed film for describing a method of producing a metal mold of the present invention.

In the present example, an aluminum target having a nickel chip with 1.5 cm cubic shape disposed thereon and a nickel substrate are selected. With respect to the nickel substrate, an uneven structure corresponding to an integral multiple of a pitch of the phase separated structure desired to be constituted is formed in a certain direction. By forming an aluminum-nickel mixed film on that substrate, as illustrated in FIG. 14, a structural body of the present invention, that is, a phase separated structure of aluminum-nickel ($Al_3Ni$) and aluminum (Al) can be arranged along the uneven structure. The above described uneven structure is suitable for providing anisotropy to dispersion of aluminum and nickel which form the structural body, but the present invention shall not be limited thereto. For example, at the time of film formation, by performing deposition of aluminum and nickel in a direction oblique to a substrate to thereby provide anisotropy in the moving direction of a source material itself toward the substrate, the phase separated structure can also be realized.

Figure 15A:
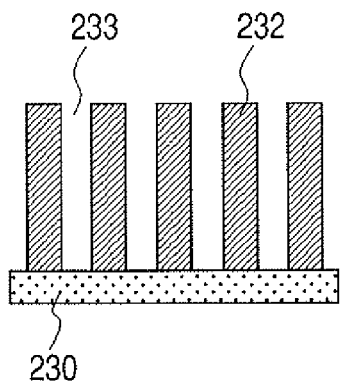
FIGS. 15A and 15B are schematic cross-sectional views illustrating a metal mold of the present invention.

Moreover, by etching the structure schematically illustrated in FIG. 13, the aluminum columnar members 213 can be dissolved selectively to form the lamellar uneven structure having a convex portion (hereinafter, referred to "protrusion") 232 as illustrated in FIG. 15A.

That is, in a method of producing a mold having a convex lamellar uneven structure on a substrate, firstly on a nickel substrate provided with anisotropy, an aluminum-nickel mixed film is formed in a nonequilibrium state. Secondly, from the mixed film having a plurality of columnar members containing aluminum-nickel ($Al_3Ni$) obtained by the film formation as a main component and a plurality of columnar members containing aluminum (Al) as a main component, the aluminum (Al) portion of the columnar members is etched to be removed selectively with phosphoric acid or ammonia water, whereby a mold including nickel (Ni) or aluminum-nickel ($Al_3Ni$) can be produced.

Moreover, as for the aspect ratio of the above described uneven structure and volume ratio of a base material to atmosphere will, the depth of the lamellar aluminum-nickel ($Al_3Ni$) uneven structure (protrusions) as illustrated in FIG. 5A can fall within the range of 100 nm or more, and the ratio of the sectional area of the lamellar aluminum-nickel ($Al_3Ni$) uneven structure (protrusions) to the area of the surface of the nickel substrate can fall within the range of 40% or more and 80% or less. Here, the ratio of the sectional area of the lamellar uneven structure can be controlled by the method in which the compositional ratio of aluminum and nickel in the aluminum-nickel mixed film is varied. In addition, the film forming rate of aluminum and nickel is considered to control the sputtering time, whereby a desired depth of the uneven structure can be obtained.

In addition, the uneven structure according to the present invention shall not be limited to the lamellar structure illustrated in FIG. 15A but will include any shape realized by the combination of the film forming conditions and the compositional ratio.

Figure 15B:
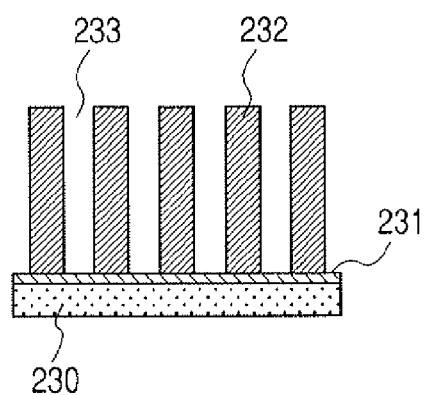

Moreover, the mold having a lamellar uneven structure on a substrate of the present invention can be one shown in FIG. 15B in which an adhesive layer 231 is provided between the above described aluminum nickel ($Al_3Ni$) or nickel (Ni) columnar members and the nickel substrate. The adhesive layer can be titanium (Ti), nickel (Ni) and an alloy thereof.

Example 5

Example 5 relates to a method of producing a mold having a concave lamellar uneven structure as with Example 4. In the present example, description will be made of a mold production method in which a mixed film including nickel (Ni) and gold (Au) mentioned above as a material that forms no compound with nickel is used. When performing sputtering of gold and nickel simultaneously in a nonequilibrium state, phase separation into a plurality of columnar members containing nickel (Ni) as a main component and a plurality of columnar members containing gold (Au) as a main component is occurred. At that time, the shape of the columnar members containing nickel (Ni) (or gold (Au)) as the main component is formed by crystal grain boundaries of crystallized nickel and gold, and a polygonal prism shape and a polygonal pyramid shape are contained therein.

As with Example 4, as for the diameter (in the short axis direction) of the columnar member and the spacing between the columnar members, by changing the compositional ratio of nickel to gold in the gold-nickel mixed film, the diameter (in the short axis direction) can be varied within a range of 10 nm or more and 200 nm or less for the cylindrical shape, and the spacing can be varied within a range of 30 nm or more and 500 nm or less. As a method of varying the compositional ratio of nickel and gold in the gold-nickel mixed film, there are included a method of stacking a gold-nickel mixed film while varying the film forming rate gradually and a method of stacking a gold-nickel mixed film using at least two kinds of targets of different compositional ratios. In the case where a sputtering method is employed, film forming conditions such as an input power, a sputtering pressure, a substrate bias, and a substrate temperature can be controlled to vary the film forming rate.

Further, by following the same procedure as in Example 4, a gold-nickel mixed film is formed on a substrate provided with anisotropy, and then, from the mixed film having a plurality of columnar members containing nickel (Ni) obtained by the film formation as a main component and a plurality of columnar members containing gold (Au) as a main component, the gold (Au) portion of the columnar members is dissolved selectively, whereby a mold composed of nickel (Ni) can be produced.

Example 6

Example 6 relates to using a mold for an optical element having a convex (protruding) lamellar aluminum-nickel uneven structure on a nickel substrate to mold an optical element.

Figure 16:
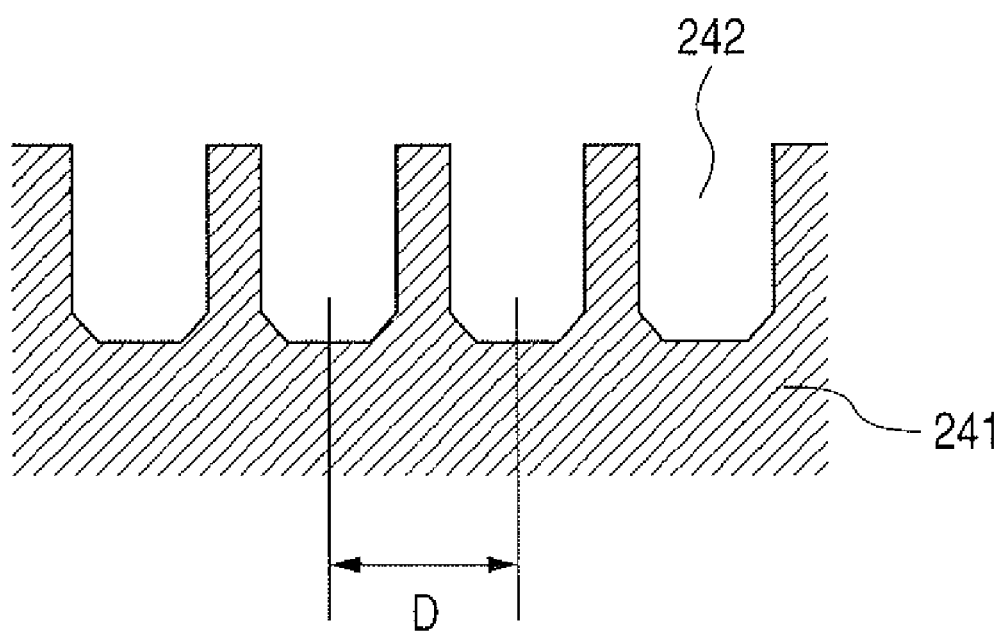
FIG. 16 is a schematic cross-sectional view illustrating grooves used in an embodiment of the present invention.

FIG. 16 is a schematic cross-sectional view illustrating a plurality of grooves obtained by a mold of an example of the present invention. In the figure, a plurality of fine grooves (concave portions) 242 having a reflection preventing function are provided at random on a surface (with the base shape being concave or convex) of an optical element 241. The fine grooves (concave portions) are formed of a periodical structure with two portions of convex columnar structure and concave structure being alternately arranged in one-dimensional direction and have a lamellar shape in which the cross section of the grooves is rectangular. The plurality of grooves 242 have substantially the same concave shape and are formed independently in the direction normal to the surface of the optical element 241.

The term "reflection preventing function" herein employed refers to a function of reducing the reflectance of the surface having the grooves provided thereon as compared to the reflectance of a mirror surface, preferably to a function to reduce the reflectance to 1% or less. Further, the plurality of grooves 242 are formed by molding on the surface of the optical element having a limited curvature.

In the present example, when the center-to-center spacing (corresponding to the length of one pitch of the rectangular lamellar shape in the short axis direction) between adjacent ones of the plurality of grooves 242 is represented by D, and the wavelength used is represented by $\lambda$, the arrangement of the grooves is set so as to satisfy the following condition equation (1):

$$D < \lambda/2 \qquad (1).$$

Here, the conditional equation (1) defines the upper limit of the center-to-center spacing D in the short axis direction of adjacent grooves 242. That is, when exceeding the upper limit of the conditional equation (1), it becomes difficult to exhibit excellent reflection preventing characteristics uniformly over the entire optical surface, which is not preferable. In addition, the lower limit does not have any restriction in terms of functions. As long as the below-mentioned volume ratio of pores to an atmosphere is appropriate, it does not matter how small the lower limit is.

Incidentally, the term "center-to-center spacing D of adjacent grooves 242" herein employed refers to the center-to-center spacing in the short axis direction in the case where grooves are arranged in a certain direction to form a lamellar shape with a rectangular sectional shape. That is, for the grooves present in a measurement region, center-to-center spacings in the short axis direction between each groove and grooves adjacent thereto are averaged, and an average value of the thus obtained average spacings is defined as the center-to-center spacing of the grooves in that arrangement.

In the present example, a plurality of grooves with substantially the same concave shape as described above are formed independently on the surface of an optical element having a limited curvature in the direction normal to the surface, whereby the entire optical surface is caused to exhibit uniform reflection preventing characteristics by development of a reflection preventing function in a direction perpendicular to the direction of arrangement of the plurality of grooves.

In the present example, in order to exhibit the reflection preventing function, it is particularly appropriate that the distance between adjacent grooves is not more than half the design wavelength $\lambda$ of the optical element which is said not to generate the 0-order diffracted light.

Therefore, in the present example, by setting such that the center-to-center spacing D between adjacent grooves satisfies the above described conditional equation (1), the reflection preventing function is exhibited.

Here, the term "design wavelength" herein employed refers to the wavelength of light that transmits through or is reflected by an optical element and refers to a wavelength at which the amount of reflected light is intended to be reduced. For example, in the case where visible light is allowed to transmit through an optical element and the amount of reflected light of 600 nm or less is desired to be suppressed, the design wavelength is regarded to be 600 nm and the distance between adjacent grooves can be made 300 nm or less. Otherwise, since the laser beam printer exemplified above employs a laser beam of 780 nm or less, the distance between adjacent pores can be 390 nm or less.

In addition, in the present example, description is made of molding an optical element with a mold for an optical element having a convex (protruding) lamellar uneven structure of aluminum-nickel, but it is possible to use a mold for an optical element having a concave (groove) lamellar uneven structure of aluminum-nickel to mold an optical element.

Next, a method of producing an optical element of the present invention will be described. Incidentally, the production method of the present invention shall not be limited to the production method described below. In the following description, it is intended to prevent reflection of 780 nm P-polarized laser. However, the reflection preventing characteristics of the optical element obtained by the present invention shall not be limited to a single wavelength laser but is applicable to visible light, ultraviolet light, and infrared light as well.

In the present invention, an optical element is formed by producing a mold for an optical element having a nickel or nickel alloy uneven structure with lamellar protrusions formed of a structural body obtained by film formation using nickel and a material which phase separates from nickel, and forming lamellar grooves by transferring the protrusions with the mold.

Otherwise, in the present invention, an optical element is formed by producing a mold for an optical element having a nickel or nickel alloy uneven structure with lamellar grooves formed of a structural body obtained by film formation using nickel and a material which phase separates from nickel, and forming lamellar protrusions by transferring the grooves with the mold.

Here, the pitch and size (width and height) of the lamellar protrusions (or grooves) can be controlled by selecting conditions appropriately.

That is, by adopting a sputtering method and appropriately selecting the film forming shaping conditions, desired protrusions (or grooves) can be formed at once over the entire mold surface, thereby forming a SWS in a short period of time at low cost.

In addition, the method for transferring protrusions (or grooves) formed on a mold includes any shaping method such as injection molding, replication molding, pressure molding, and cast molding, but it is particularly suitable to use the injection molding or pressure molding which enables an SWS to be efficiently transferred and molded together with a substrate. In these methods, at the time of mold release, the direction of the protrusions (or grooves) is not always parallel to the mold releasing direction. However, by performing mold release while grooves (or protrusions) formed by transfer of protrusions (or grooves) is still deformable to a certain degree, for example, prior to complete solidification of grooves, mold release can be easily carried out.

In particular, in the mold with lamella protrusions (or grooves) of the present invention, since the ratio (D1/Ds) of the diameter D1 in the long axis direction of the protrusion to the diameter Ds in the short axis direction thereof is 5 or more, and since the protrusion shape has a length also in the direction perpendicular to the mold releasing direction, the durability is better and the mold releasability is more excellent than the mold having cylindrical or conical protrusions (or pores), and mold release can be easily carried out without destroying an SWS.

(Optical Element Production Method 7)

An optical element production method 7 according to Example 6 is directed to using a mold for an optical element having a lamellar aluminum-nickel uneven structure (protrusions) on a nickel substrate to mold an optical element.

The optical element production method 1 will be described. At first, a mold having a free curved surface for molding an fθ lens as an optical element was prepared, and a primer layer and an aluminum-nickel layer were uniformly formed in this order on the free curved surface by sputtering, whereby a metal mold having a free curved surface covered by an aluminum-nickel mixed film was obtained. Here, prior to the formation of the aluminum-nickel layer, an uneven structure was formed at a 200 nm pitch in a given direction on the mold. The uneven structure was formed by tape varnishing using an abrasive tape impregnated with diamond slurry or the like. On the mold having the uneven structure thus formed thereon, the aluminum-nickel mixed film was formed by a magnetron sputtering process using an RF power supply. As the target, an aluminum target of 4 inches (101.6 mm) in diameter having a nickel chip with 1.5 cm cubic shape disposed thereon was used. The film forming conditions were an input power of RF 120 W, an argon gas pressure of 0.11 Pa and a substrate temperature of 400° C., and the film formation was performed until a desired film thickness was attained.

FIG. 13 is a schematic perspective view of the aluminum-nickel mixed film depicted based on the result of observation with an FE-SEM (Field Emission Scanning Electron Microscope). In the thus formed aluminum-nickel mixed film 211, it was confirmed that the aluminum-nickel ($Al_3Ni$) portion 212 with a columnar structure was formed in the film volume direction perpendicularly to the nickel substrate 210, and further that the aluminum columnar structure 213 was formed surrounding the aluminum-nickel ($Al_3Ni$) portion 212. Then, the entire mold was covered with a masking tape so as to expose only the free curved surface; the portion except the free curved surface was covered so as to be electrically insulated and waterproofed; and the mold was dipped into an aqueous phosphoric acid solution at room temperature. Thus, aluminum surrounding the aluminum-nickel ($Al_3Ni$) portion was dissolved to obtain a mold for fθ lens having the aluminum-nickel ($Al_3Ni$) protrusions on the surface thereof.

When the thus obtained mold for fθ lens was observed with an FE-SEM (Field Emission Scanning Electron Microscope), it was found that lamellar protrusions stood perpendicularly to the mold surface in an arrangement along the previously formed texture uneven structure. Image processing was carried out to determine the central positions of the protrusions in the short axis direction and to determine center-to-center spacings D between each central protrusion and adjacent protrusions respectively to thereby find the center-to-center spacing D between adjacent protrusions in the short axis direction to be approximately 200 nm. The molds produced through the above described procedure were used for molding a light incident side surface and a light exit side surface of a lens in an injection molding machine (SS180 (trade name); produced by Sumitomo Heavy Industries, Ltd.) a cycloolefin polymer (produced by ZEON Corporation) was injection molded to give an fθ lens. At that time, the molten polymer temperature and the dwell pressure at the time of polymer injection were set to 270° C. and 700 kg/cm$^2$, respectively.

When the thus obtained fθ lens was observed with an FE-SEM (Field Emission Scanning Electron Microscope), lamellar grooves with a rectangular cross section arranged at random entirely on the curved surfaces were observed, and the respective grooves with the rectangular cross section were confirmed to be formed in a direction normal to the surfaces.

In addition, image processing was performed to determine the center positions of the grooves with the rectangular cross section and to determine an average of center-to-center spacings D between each groove and adjacent grooves respectively to thereby find the center-to-center spacing D between adjacent grooves in the short axis direction to be approximately 200 nm, whereby the transfer of the protrusions of the molds to the lens was confirmed to be attained.

Moreover, when the shapes of the lamellar grooves were measured with an atomic force microscope (AFM), it was found that the depths of the grooves were approximately uniform toward the tip; the average depth was about 160 nm; and the volume ratio of the grooves was about 60%. Then, the reflectance at the time of perpendicular incidence of 780 nm wavelength P-polarized light was measured by use of a spectrophotometer to be 0.6%.

INDUSTRIAL APPLICABILITY

The optical element molded using a mold for an optical element according to the present invention has a function of suppressing the amount of interfacial reflection of light from incident and exit surfaces and can be utilized for, for example, imaging apparatuses such as cameras and digital camcorders and projection apparatuses such as liquid crystal projectors, liquid crystal panels, and optical scanning devices of electrophotographic apparatuses.

While the present invention has been described with reference to exemplary embodiments, it is to be understood that the invention is not limited to the disclosed exemplary embodiments.

The scope of the following claims is to be accorded the broadest interpretation so as to encompass all such modifications and equivalent structures and functions.

This application claims the benefit of Japanese Patent Application Nos. 2006-075617, filed on Mar. 17, 2006, and 2006-193248, filed on Jul. 13, 2006 which are hereby incorporated by reference herein in their entirety.

What is claimed is:

1. A method comprising:
    forming a mixed film using nickel and a material which phase separates from nickel simultaneously on a nickel substrate having a convex surface or a concave surface by sputtering, the mixed film comprising a plurality of cylinders comprising nickel as a component thereof and a matrix region comprising the material which phase separates from nickel as a component thereof and surrounding the plurality of cylinders; and
    removing the matrix region from the mixed film by etching to manufacture a mold comprising nickel or a nickel alloy, and
    wherein a protrusion volume ratio is from 35% to 62%.

2. The method according to claim 1, wherein the shape of the cylinders of the mold comprising nickel or the nickel alloy is controlled by varying a compositional ratio of nickel and the material which phase separates from nickel in the mixed film.

3. The method according to claim 1, wherein the material which phase separates from nickel contains at least one of aluminum, magnesium, titanium, yttrium and zirconium which have a eutectic equilibrium diagram with nickel.

4. The method according to claim 1, wherein the material which phase separates from nickel contains at least one of silver and gold which form no compound with nickel.

5. The method according to claim 1, wherein the mold comprising nickel or the nickel alloy is formed of an uneven structure of a plurality of convex cylinders or circular cones.

6. The method according to claim 1, wherein phosphoric acid or ammonia is used in the etching.

7. The method according to claim 1, further comprising a step of performing molding using the mold.

8. A method comprising:
    forming a mixed film using nickel and a material which phase separates from nickel simultaneously on a substrate having a convex surface or a concave surface by sputtering, the mixed film comprising a plurality of cylinders comprising nickel as a component thereof and a matrix region comprising the material which phase separates from nickel as a component thereof and surrounding the plurality of cylinders; and
    removing the matrix region from the mixed film by etching to manufacture a mold comprising nickel or nickel alloy protrusions,
    wherein a protrusion volume ratio is from 35% to 62%.

* * * * *